United States Patent
Noonan

(10) Patent No.: US 9,174,585 B2
(45) Date of Patent: Nov. 3, 2015

(54) DEVICES AND METHODS FOR SECURING SKIS, SNOWBOARDS, ETC. TO CROSSBARS OF VEHICLE ROOF RACKS

(71) Applicant: Mark Noonan, New Canaan, CT (US)

(72) Inventor: Mark Noonan, New Canaan, CT (US)

( * ) Notice: Subject to any disclaimer, the term of this patent is extended or adjusted under 35 U.S.C. 154(b) by 96 days.

(21) Appl. No.: 14/144,230

(22) Filed: Dec. 30, 2013

(65) Prior Publication Data

US 2014/0131405 A1 May 15, 2014

Related U.S. Application Data

(63) Continuation-in-part of application No. 13/166,336, filed on Jun. 22, 2011, now abandoned.

(60) Provisional application No. 61/398,199, filed on Jun. 22, 2010.

(51) Int. Cl.
*B60R 9/04* (2006.01)
*B60R 9/12* (2006.01)
*B60R 9/048* (2006.01)
*B60R 9/08* (2006.01)

(52) U.S. Cl.
CPC . *B60R 9/12* (2013.01); *B60R 9/048* (2013.01); *B60R 9/08* (2013.01)

(58) Field of Classification Search
CPC .................................... B60R 9/12; B60R 9/08
USPC ......... 224/309, 315, 319, 321, 324–326, 330, 224/331, 560, 570, 917.5; 280/814; 269/228, 95, 71, 143
See application file for complete search history.

(56) References Cited

U.S. PATENT DOCUMENTS

| | | | |
|---|---|---|---|
| 2,228,593 A * | 1/1941 | Dibble | B60R 9/02 224/42.31 |
| 3,209,970 A | 10/1965 | Canell | |
| 4,381,070 A | 4/1983 | Langbauer | |
| 5,040,324 A | 8/1991 | Rivera et al. | |
| 6,234,372 B1 | 5/2001 | Rivera | |
| 6,929,162 B1 | 8/2005 | Jordan | |
| 6,983,525 B2 | 1/2006 | Moreno | |
| 7,004,682 B1 * | 2/2006 | Moody | B25B 5/10 269/902 |
| 2002/0125282 A1 | 9/2002 | Laverack et al. | |
| 2008/0034561 A1* | 2/2008 | Emmerling | B60R 9/055 24/514 |
| 2011/0309120 A1 | 12/2011 | Noonan | |

FOREIGN PATENT DOCUMENTS

FR 2627144 8/1989

* cited by examiner

*Primary Examiner* — Adam Waggenspack
(74) *Attorney, Agent, or Firm* — Harness, Dickey & Pierce, P.L.C.

(57) ABSTRACT

The present disclosure generally relates to devices that can be used for mounting and securing skis, snowboards, among other equipment to vehicle roof racks (e.g., luggage racks, factory-installed racks, after-market racks, etc.), such as those having crossbars. In an exemplary embodiment, there is a device suitable for use in securing an article to a vehicle roof rack having one or more crossbars. The device generally includes at least one hook component including a curved portion configured to be hooked under a crossbar of a vehicle roof rack. The device also includes a clamping apparatus operable for creating a clamping force to secure the device and the article to the crossbar.

14 Claims, 28 Drawing Sheets

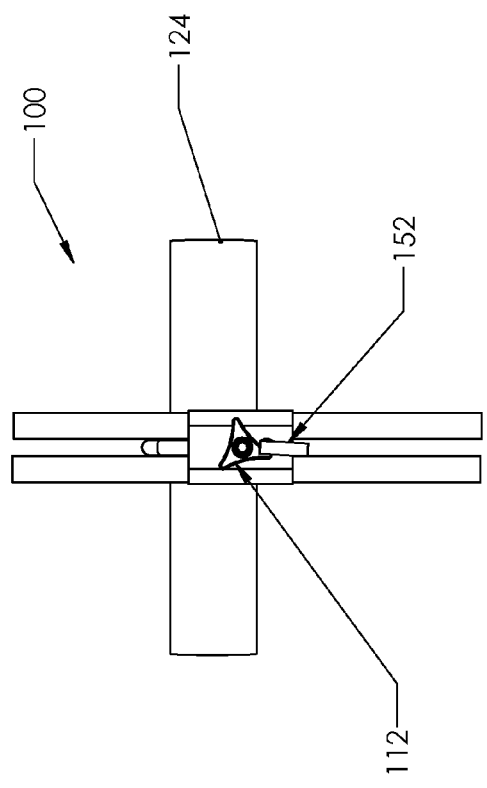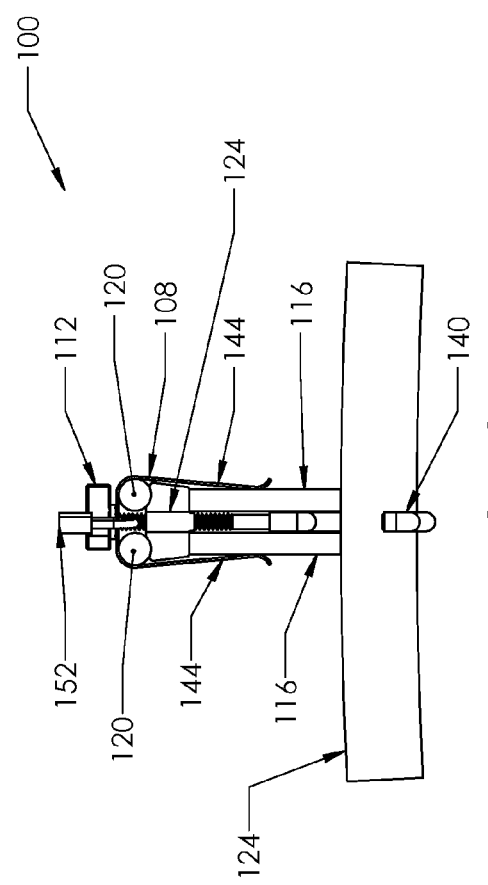

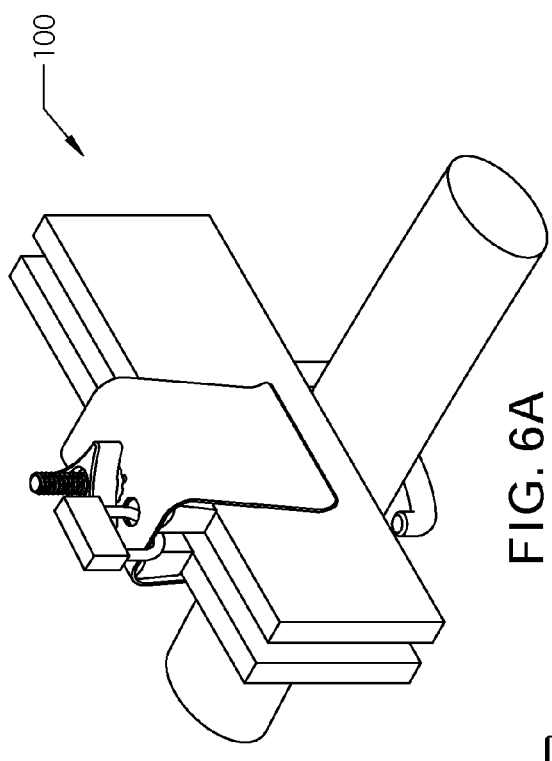
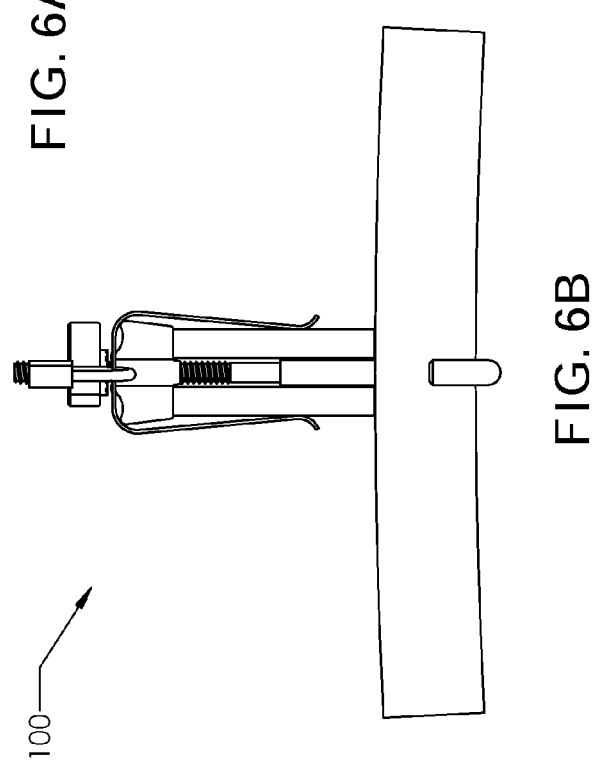

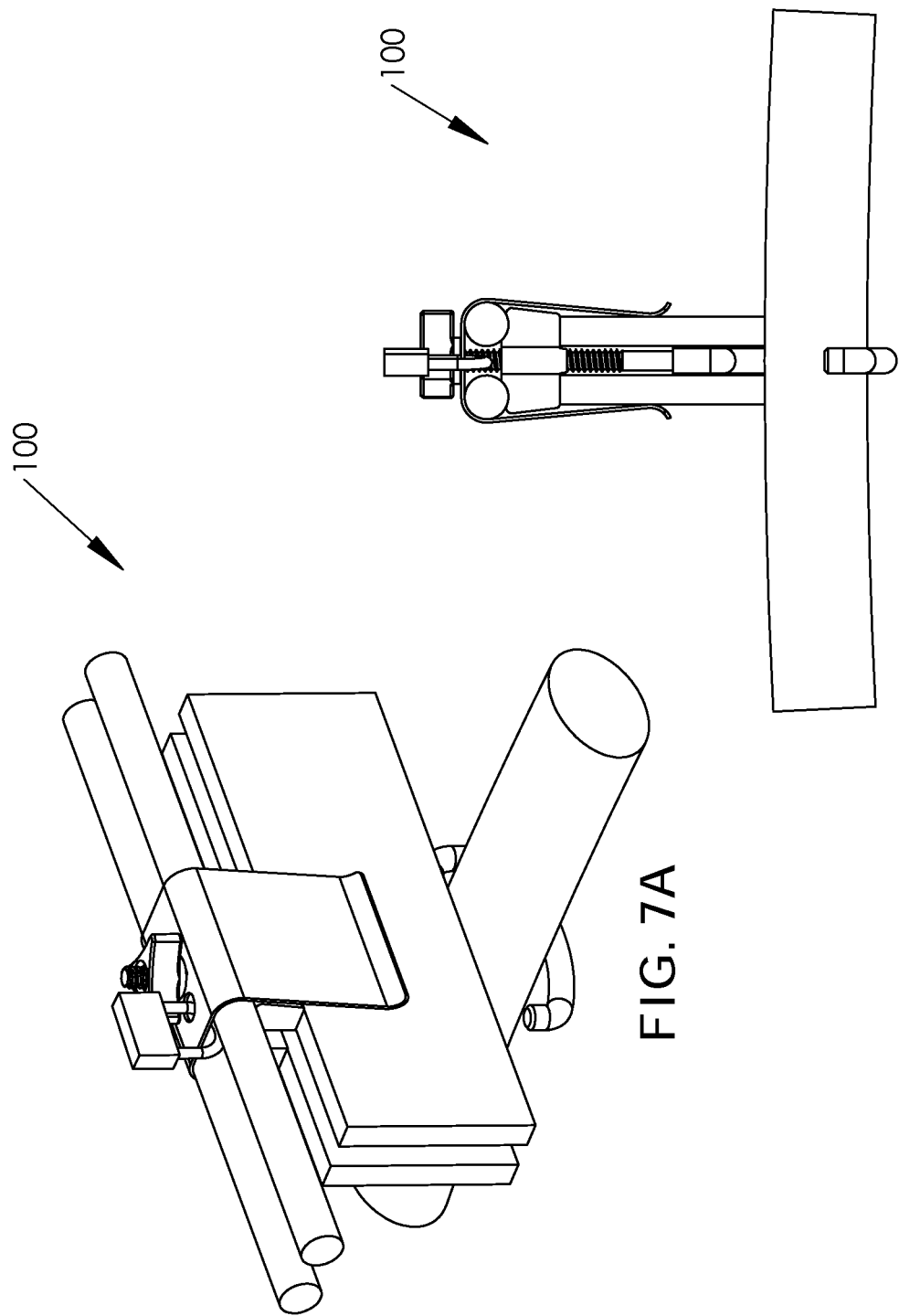

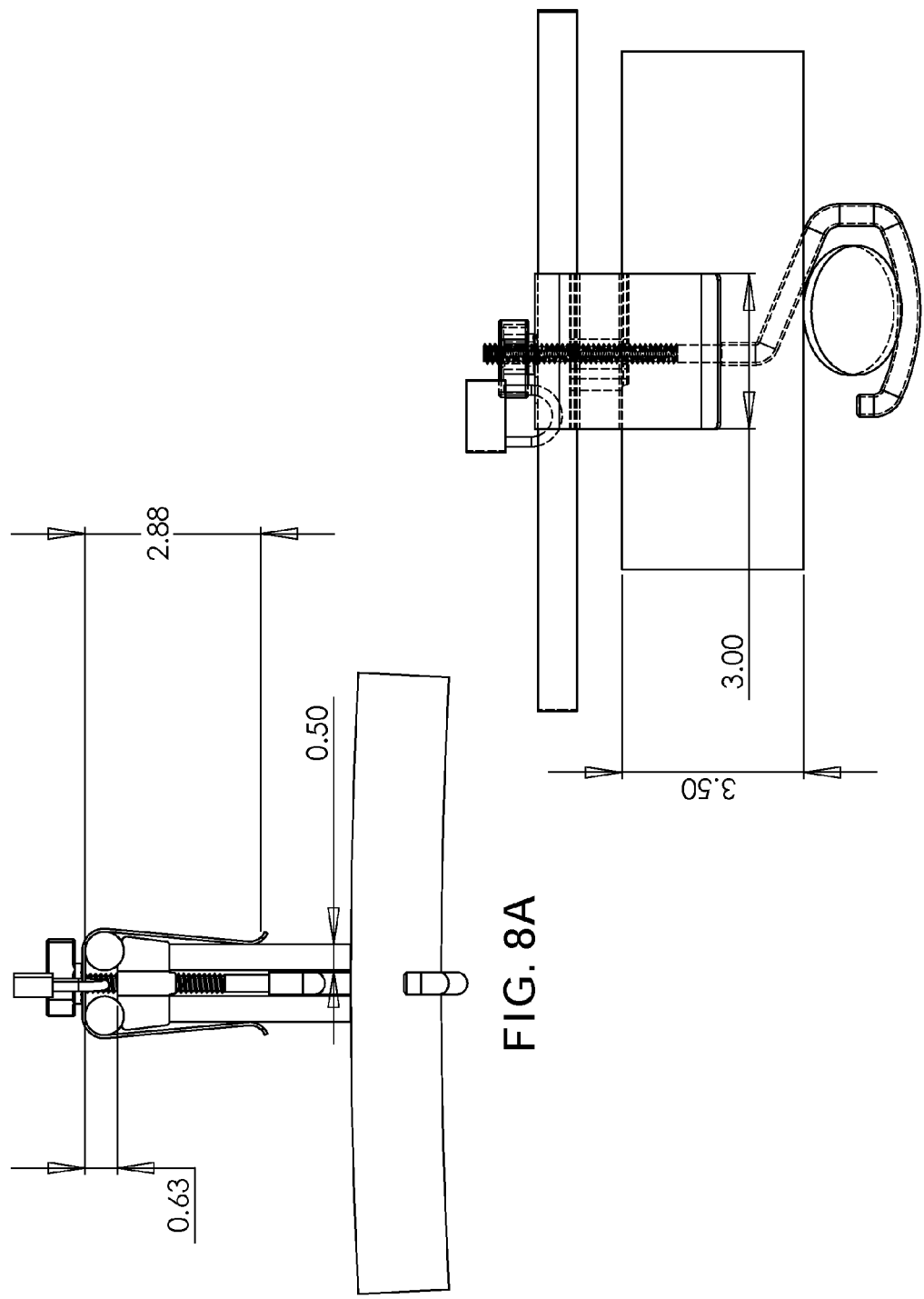

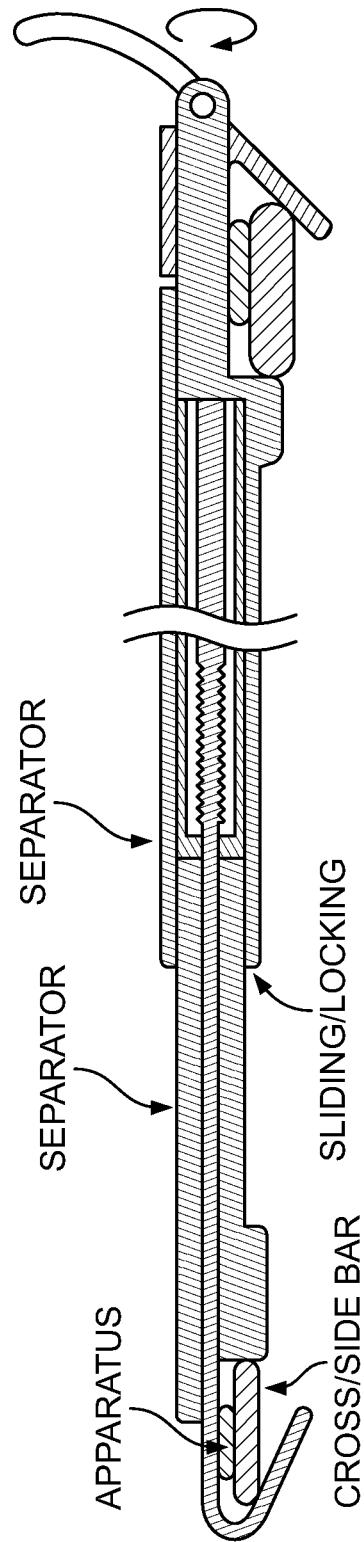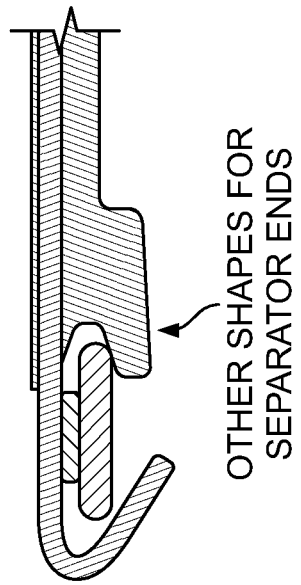
FIG. 23

US 9,174,585 B2

DEVICES AND METHODS FOR SECURING SKIS, SNOWBOARDS, ETC. TO CROSSBARS OF VEHICLE ROOF RACKS

CROSS-REFERENCE TO RELATED APPLICATIONS

This application is a continuation-in-part of U.S. utility patent application Ser. No. 13/166,336 filed Jun. 22, 2011 which, in turn, claims priority to and the benefit of U.S. Provisional Patent Application Ser. No. 61/398,199 filed Jun. 22, 2010. The entire disclosure of the aforementioned applications are incorporated herein by reference in their entirety.

FIELD

The present disclosure generally relates to devices that can be used for mounting and securing skis, snowboards, among other equipment to vehicle roof racks (e.g., luggage racks, factory-installed racks, after-market racks, etc.), such as those having crossbars.

BACKGROUND

This section provides background information related to the present disclosure, which is not necessarily prior art.

Most ski racks, snowboard racks, and other racks as well as adapters for racks are designed to fit on certain crossbars, such as those having a specific shape and profile. Significantly, the typical rack or adapter is installed first, and then the skis, snowboards and other objects are secured to the rack or adapter.

Generally, for example, ski or snowboard attachments or adapters cannot hold the skis or equipment securely enough to be held only against one adapter (i.e., on one crossbar). Thus, conventional adapters are typically provided in pairs that attach to the two crossbars at the front and back of the rack.

There are various types of ski racks, sports racks, luggage or roof racks, adapters/attachments, and systems for attaching skis, snowboards, and other equipment. For the purpose of this application, the terms "skis" or "snowboards" as used herein are intended to be generic and include all types of ski or similar sized sports equipment that are mounted on roof racks. Similarly, the terms "rack", "adapter", "attachments", "sports rack", "cross members", "crossbars", "side rails," or other such terms are also intended to refer generically to bars, brackets, and other assemblies, permanently or removably installed on the roof of cars or other vehicles in order to transport or carry skis, other sports-related equipment, and non-sports related equipment.

The scope of present disclosure includes ski, sports equipment, and other type carriers and racks designed to adapt to cross members of multi- or single-function rack adapters or attachments, including two-sided, hinged or scissor-type ski rack systems (e.g., where the ski rack adapter after being installed on the crossbars is open to accept or remove skis or snowboards, etc.) and various other designs, many of which involve after-market racks or rack systems. Generally, rack towers (side supports) attach to a vehicle or side rails mount to the vehicle's door moldings or rain gutters or the sides of the roof above the gutters. Attached to the towers are crossbars or members spanning across the car, with one crossbar, for example, between each of the two sets of towers. Specialized rack attachments or carriers (e.g., for skis, bikes, kayaks, canoes, etc.) are commonly mounted on the cross members/bars and added/removed as needed depending on the season or time of year and the desired function for various sport equipment or other items being secured to the rack and roof of the vehicle.

Many factory installed roof racks for vehicles (e.g., luggage racks or otherwise, etc.) also have cross members, or in some cases, only side rails for luggage or cargo (e.g., to which after-market cross members can be added). Specialty adapters sold by the vehicle, rack manufacturers, or third-party manufacturers are designed for specialty uses to carry similar sport and other equipment as mentioned for the aftermarket racks above. Because sports racks for specific equipment like skis, and specialty adapters for skis must be installed separately (i.e., before installing the equipment they are designed for), the inventor hereof has recognized that owners/users oftentimes avoid the inconvenience of extra or frequent installations and uninstalling or removal, and instead simply leave the specialty adapters installed on the beyond when needed despite the added wind noise, drag, and inconvenience when other seasons require installation of other specialized adapters.

Many of these specialty brackets, adapters, etc., are designed to fit only one or a subset of the crossbars or members, which come in a variety of sizes and cross sectional shapes (e.g., square, spheroid, prolate spheroid, round, etc.). Some fit a variety of shaped crossbars though not always in an optimal condition as the shape of the crossbar and adapter brackets may not match well. In many cases, generic adapters (adapters that are not designed for or matched to a specific cross section crossbar) have either four attachment points or bolts, such that require significant time to install and remove the generic adapters.

Additionally, specialty adapters or components for skis, snowboards, bikes, poles, etc., often are not capable of being quickly installed and/or removed as such specialty adapters are not designed with quick release. Instead, such specialty adapters may require two or more nut/bolt assemblies in order to be secured to each attachment point on the cross members (typically there are two cross members). Due to this inconvenience, the inventor hereof has recognized that adapters are often left installed for the season or beyond the immediate need or use to hold or carry the designated equipment, as the time to change the adapters for the different equipment often deters the use of the proper adapters. For example, a single ski alternatively might be secured with bungee cords or other means rather than by fully installing, then de-installing the ski adapters/racks.

SUMMARY

This section provides a general summary of the disclosure, and is not a comprehensive disclosure of its full scope or all of its features.

The present disclosure generally relates to devices that can be used for mounting and securing skis, snowboards, among other equipment to vehicle roof racks (e.g., luggage racks, factory-installed racks, after-market racks, etc.), such as those having crossbars. In an exemplary embodiment, there is a device suitable for use in securing an article to a vehicle roof rack having one or more crossbars. The device generally includes at least one hook component including a curved portion configured to be hooked under a crossbar of a vehicle roof rack. The device also includes a clamping apparatus operable for creating a clamping force to secure the device and the article to the crossbar.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
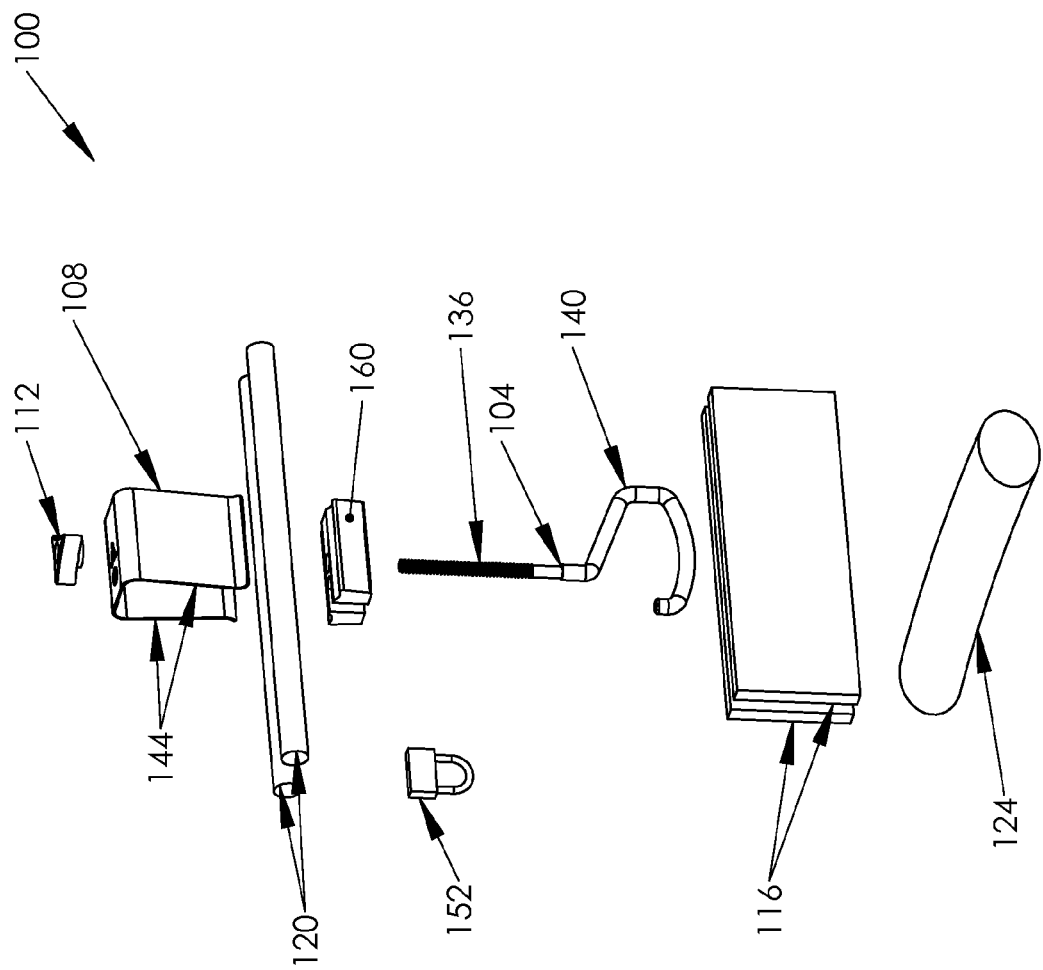
FIG. 2 is an exploded perspective view of the device shown in FIG. 1 and illustrating portions of the pair of skis and poles which may be secured to a vehicle roof rack with the device.
Figure 3:
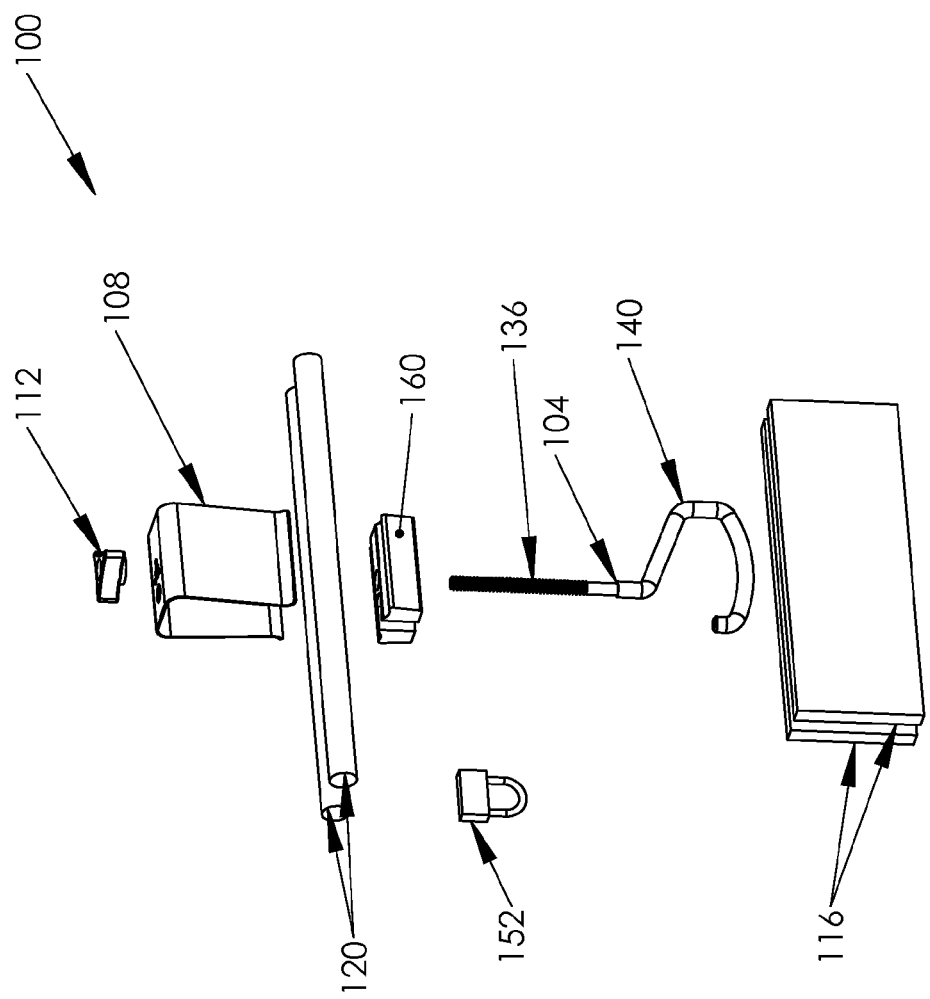
FIG. 3 is a partial exploded perspective view of the device shown in FIG. 2 after being partially assembled.
Figure 4:
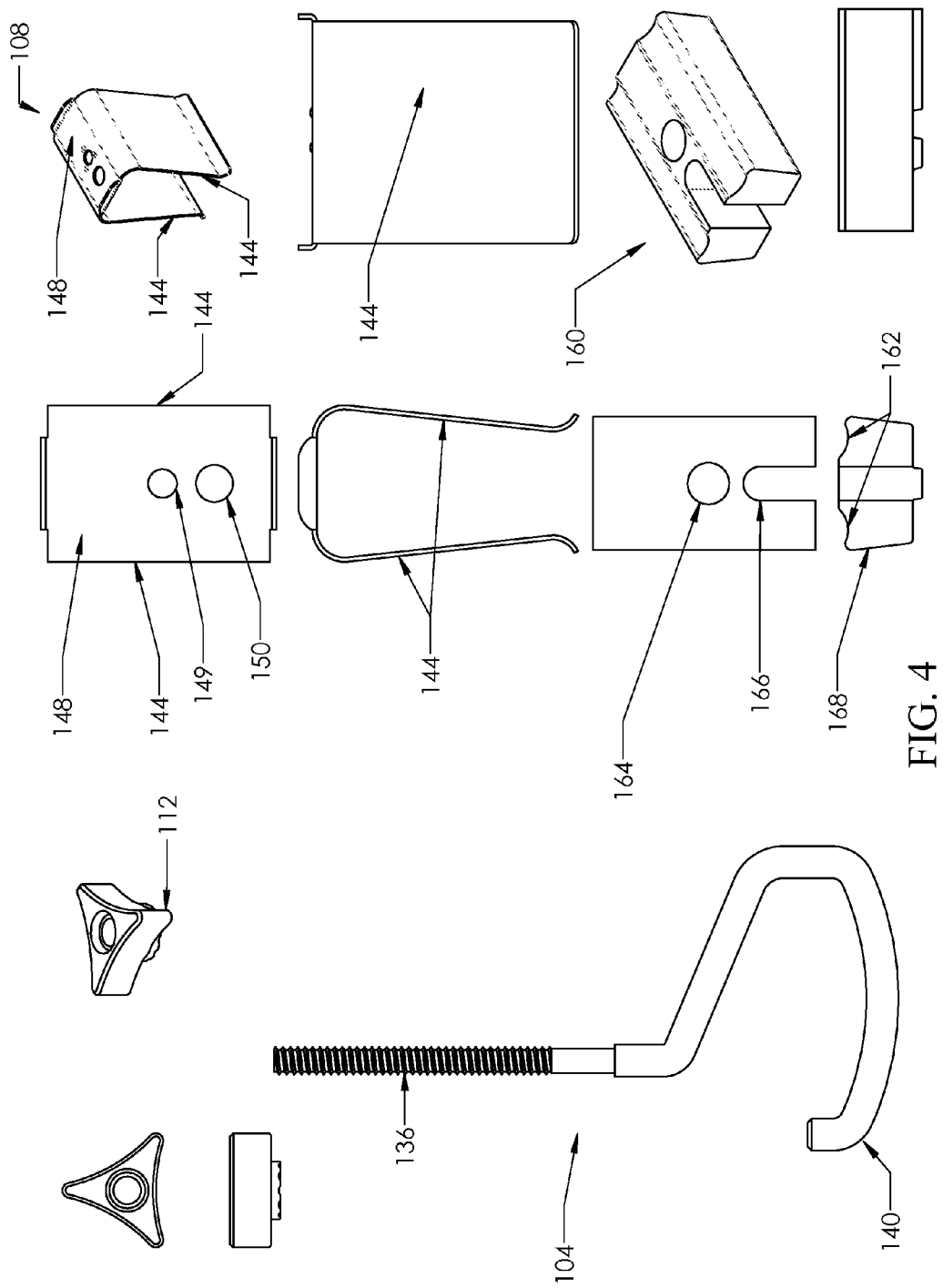
Figure 5A:
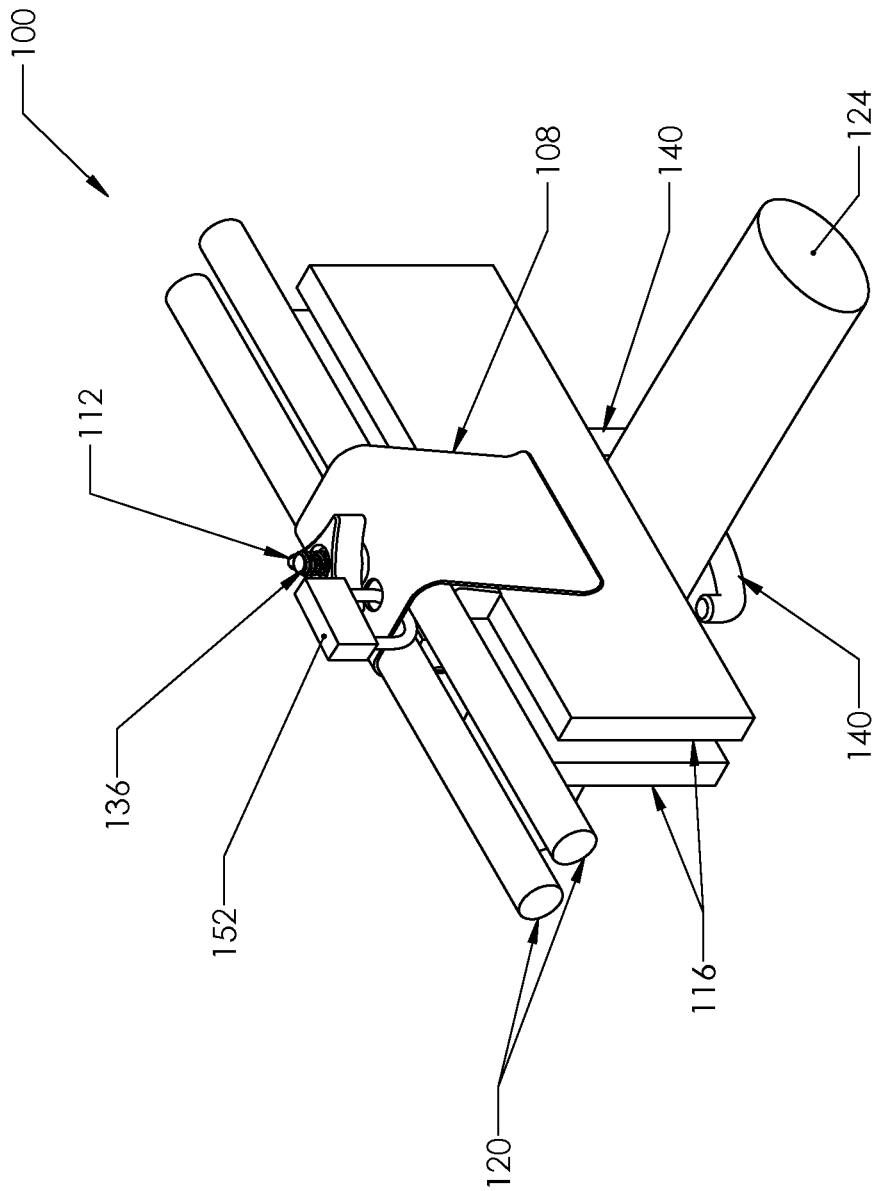
Figure 9:
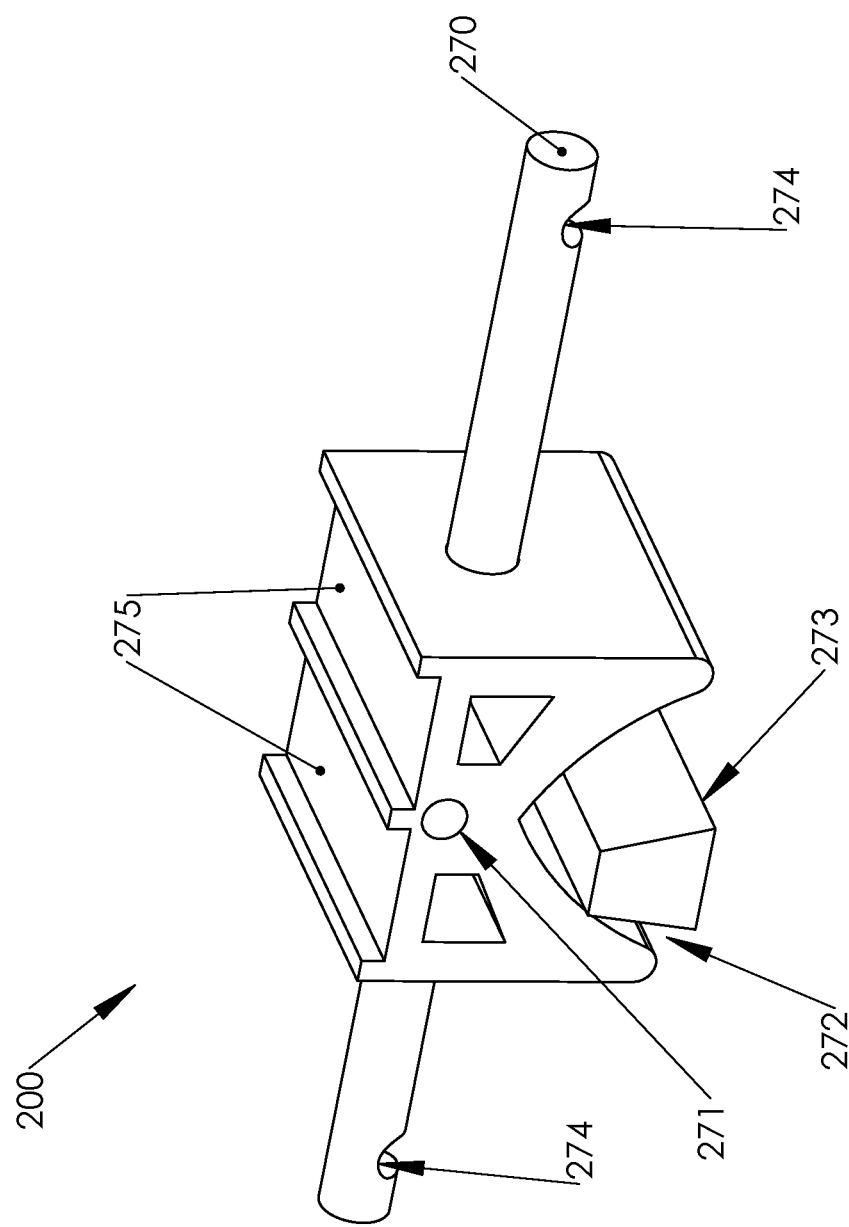
Figure 10:
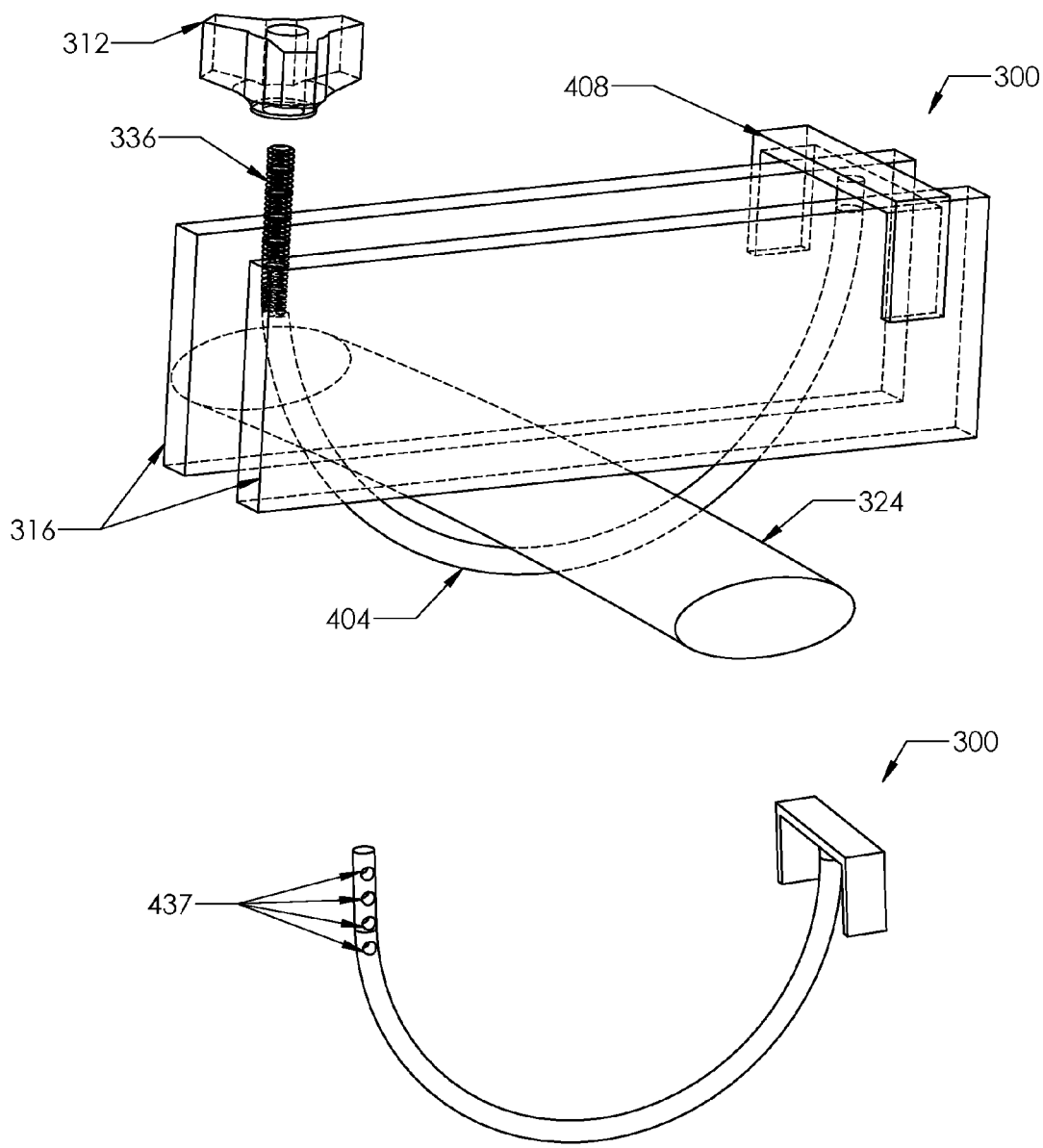
Figure 11A:
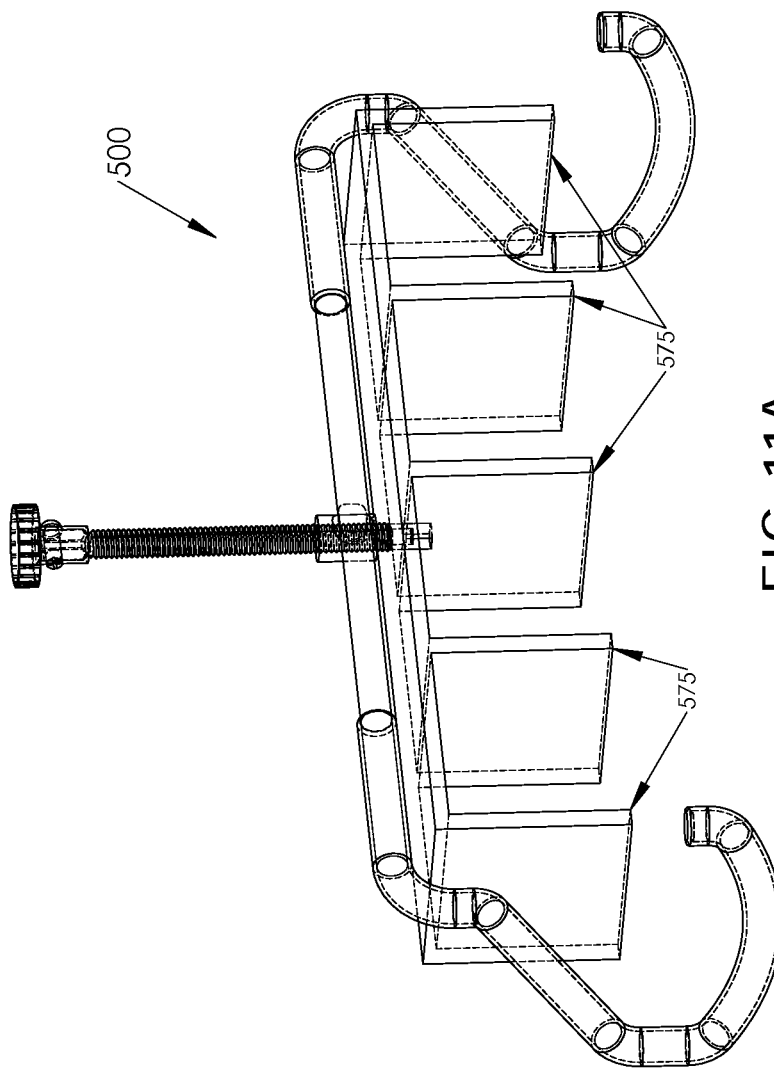
Figure 11B:
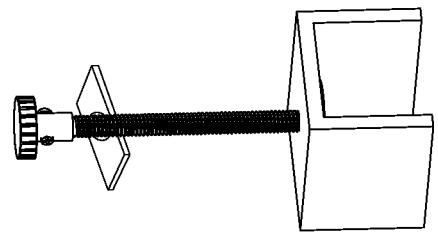
Figure 12:
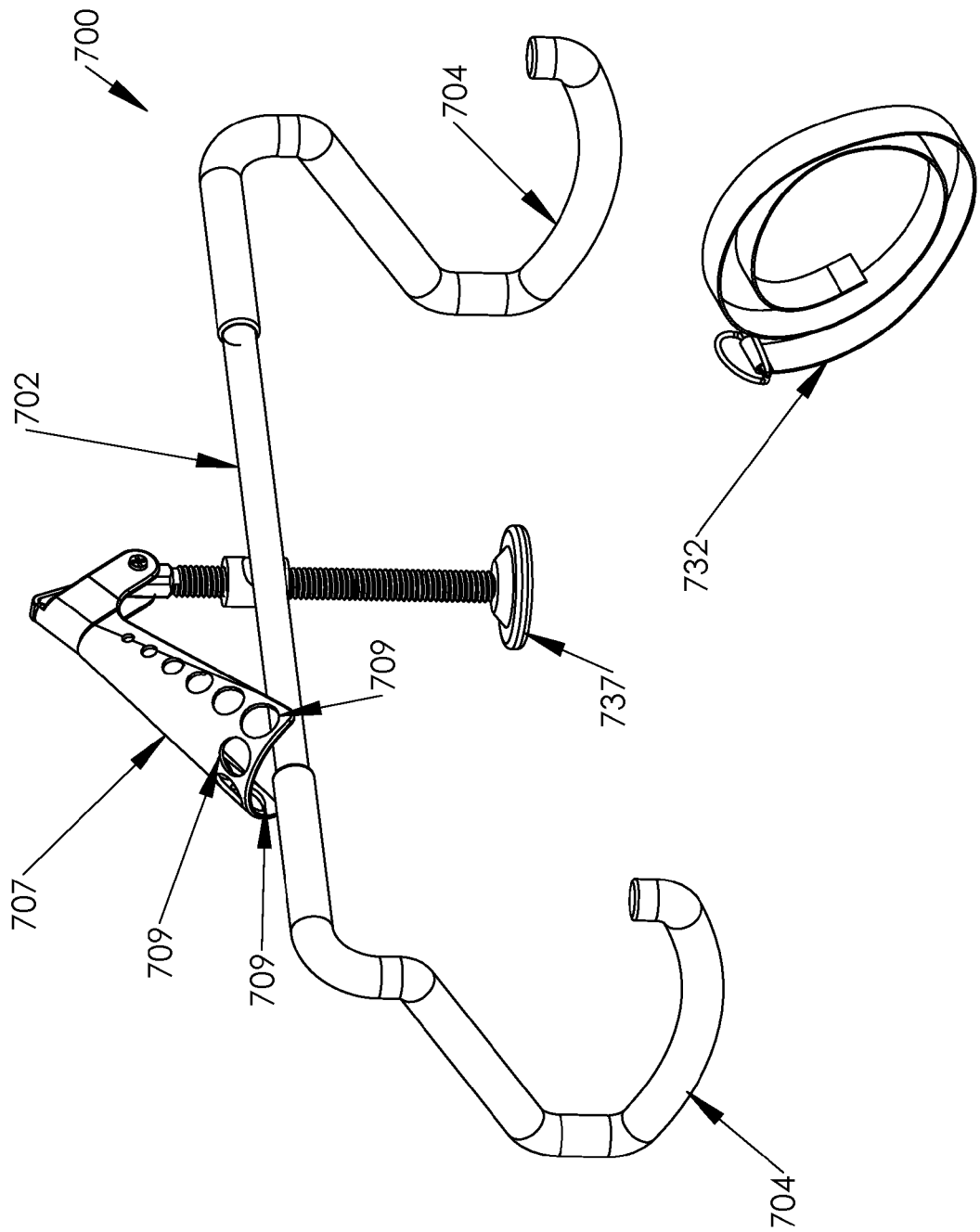
Figure 13:
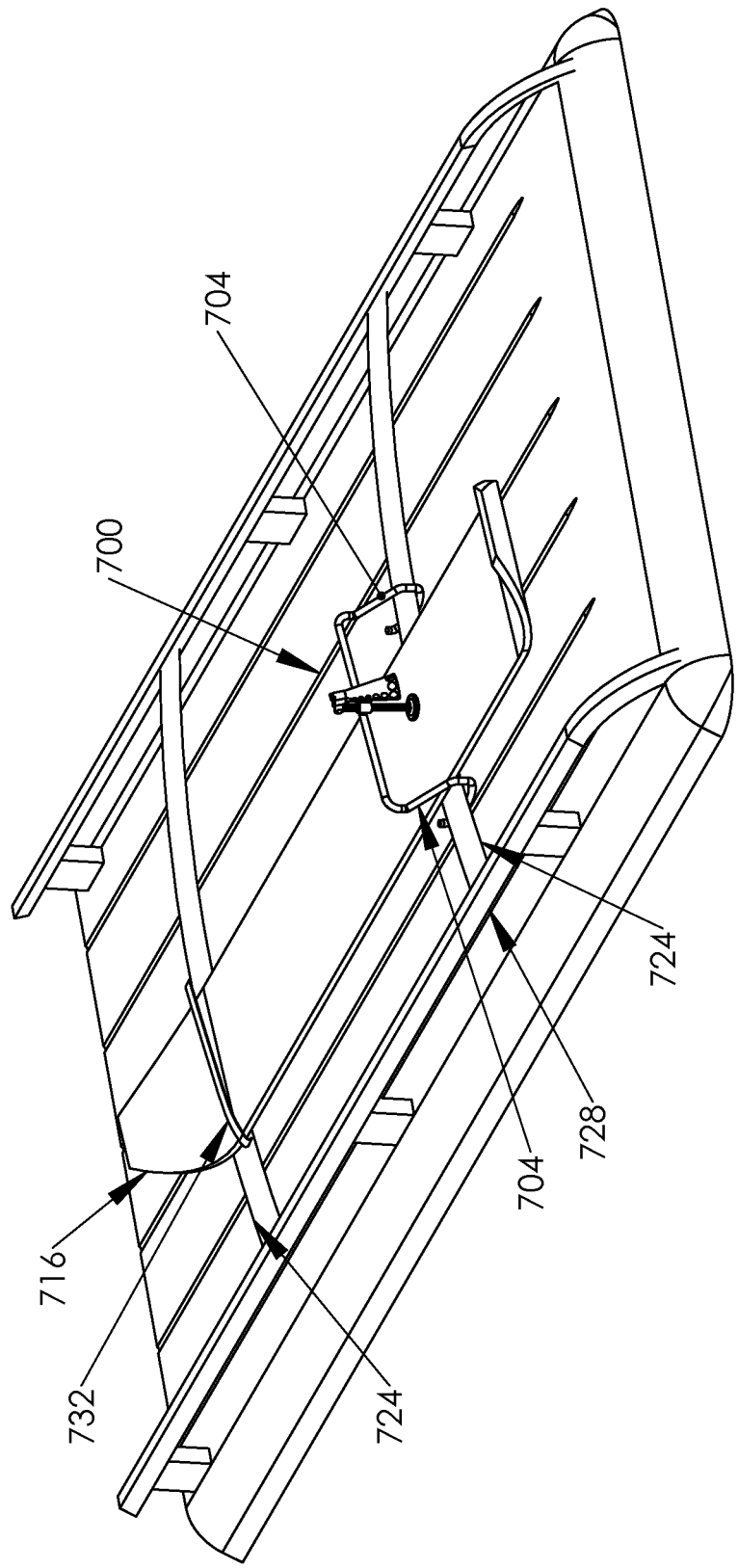
Figure 14:
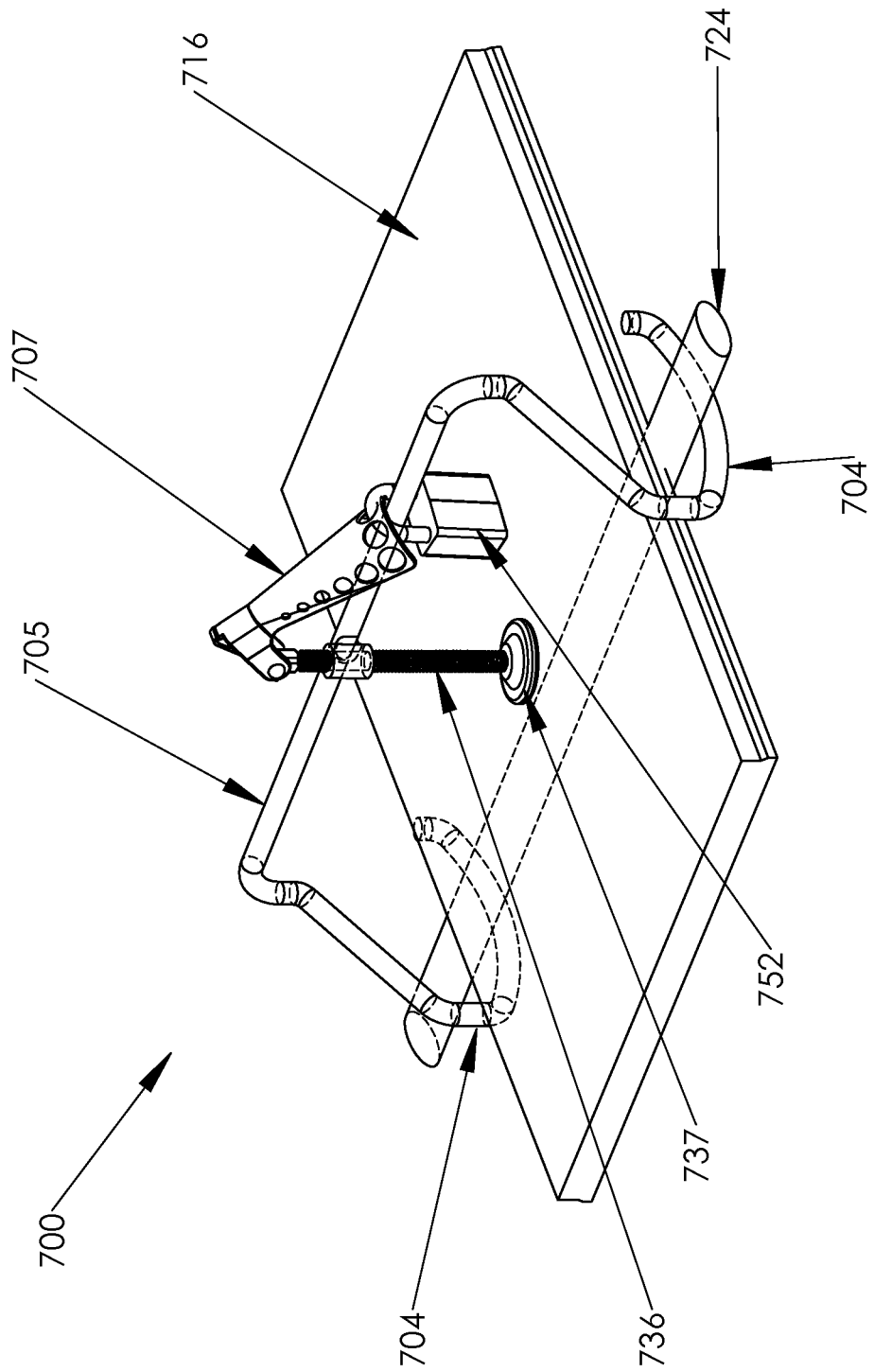
Figure 15:
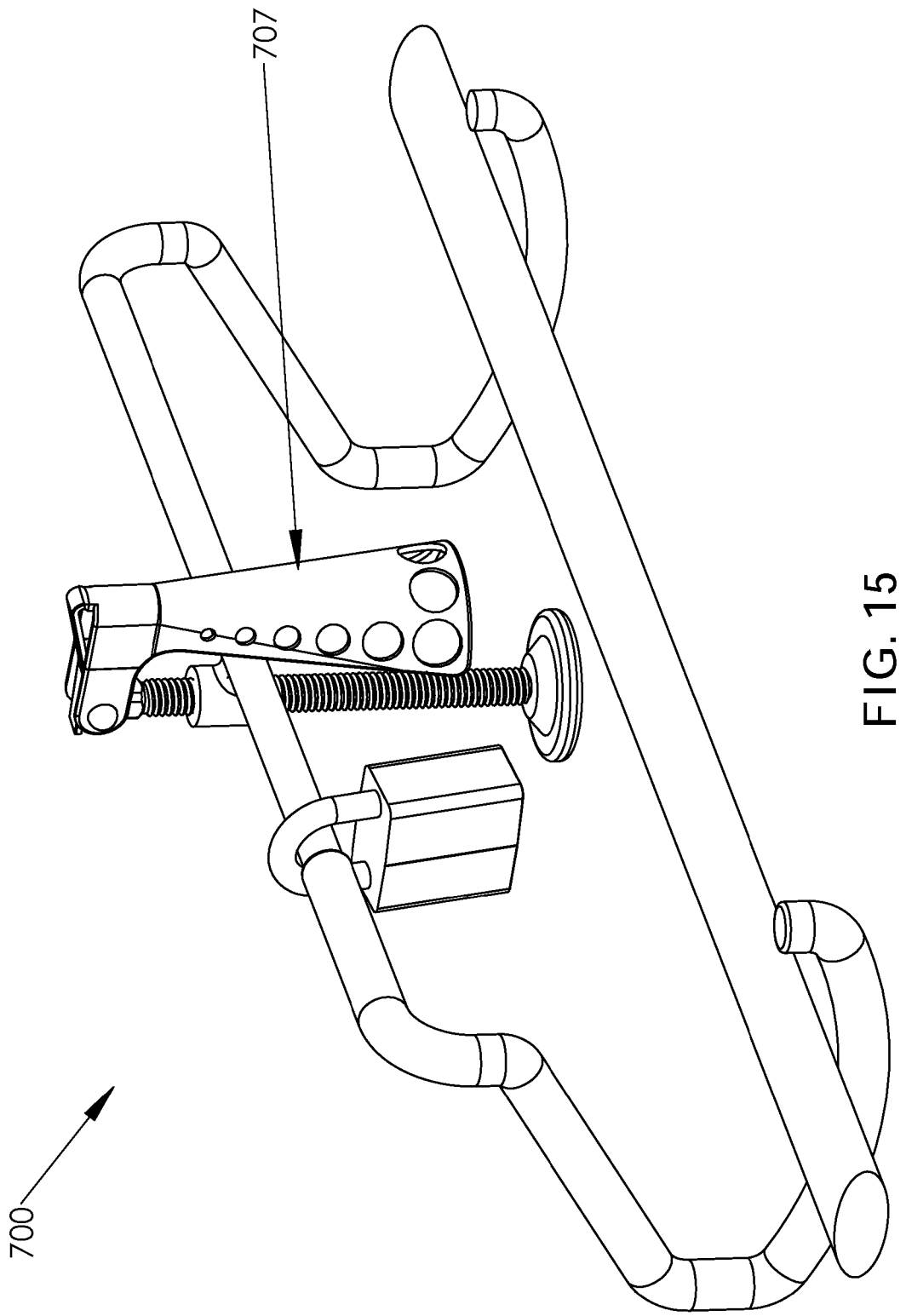
Figure 16:
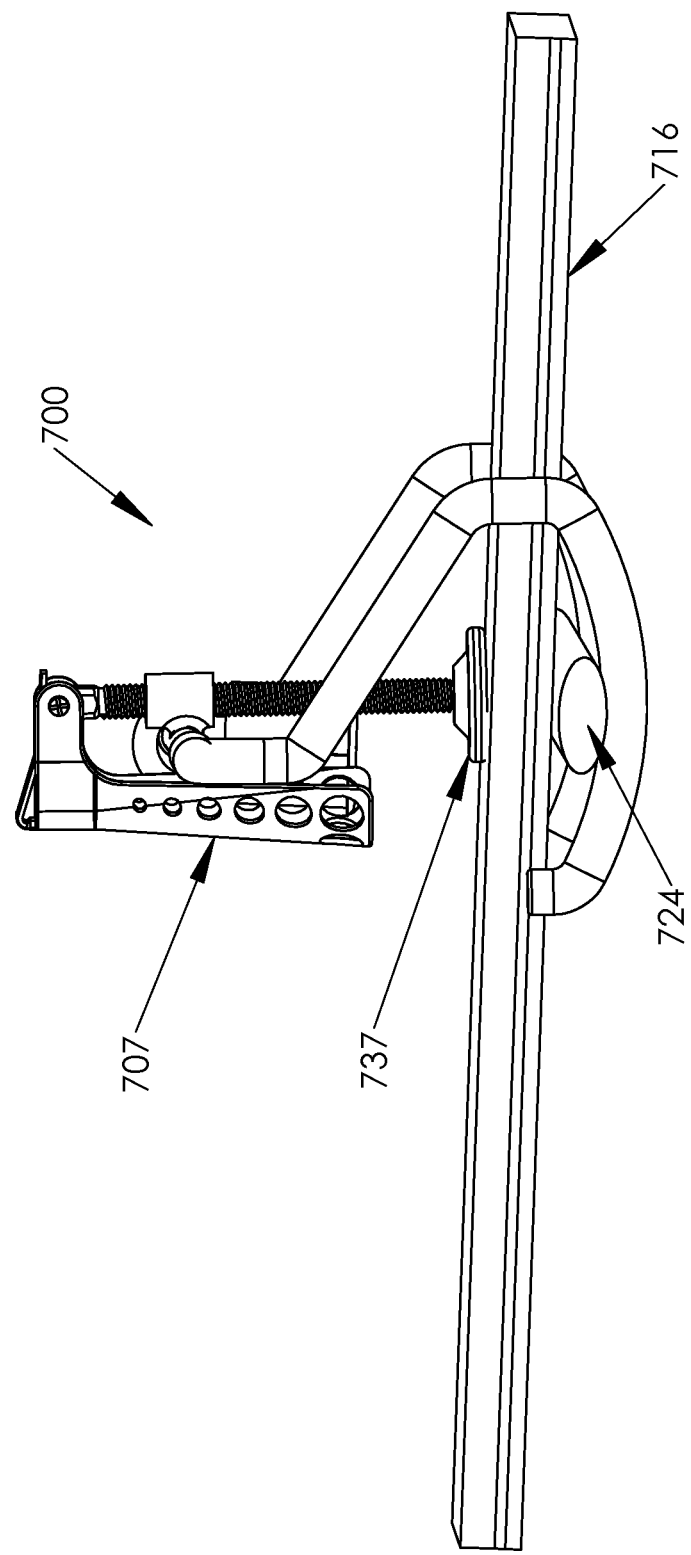
Figure 17:
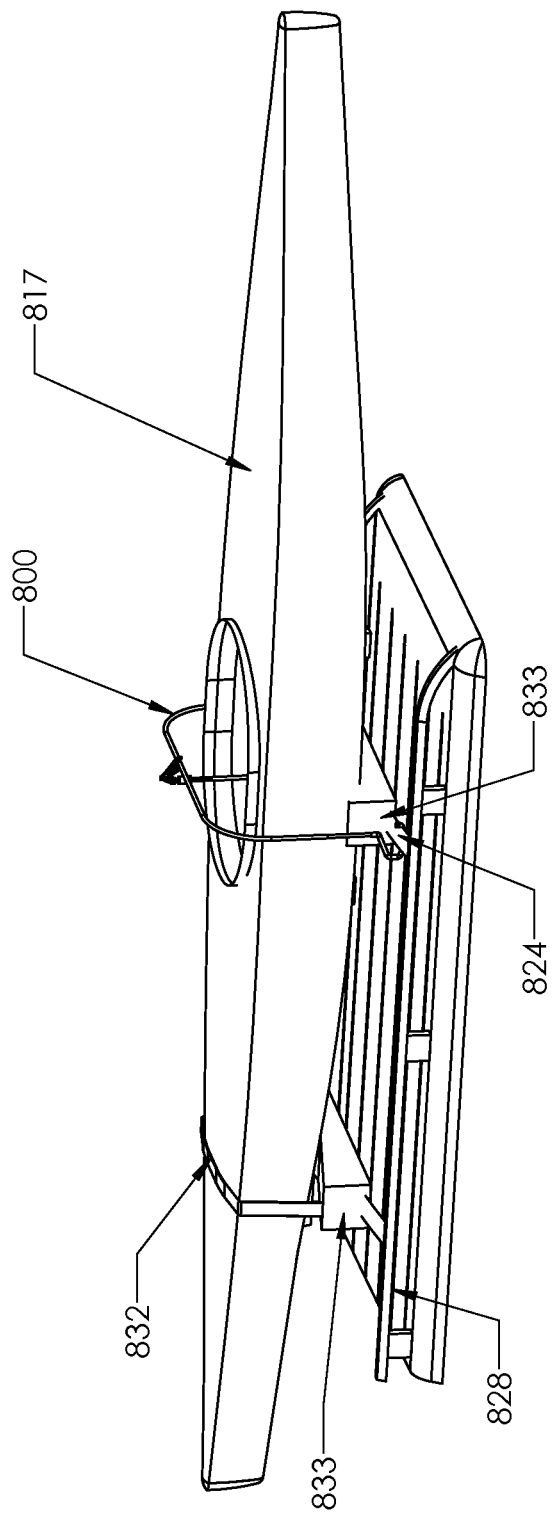
Figure 19:
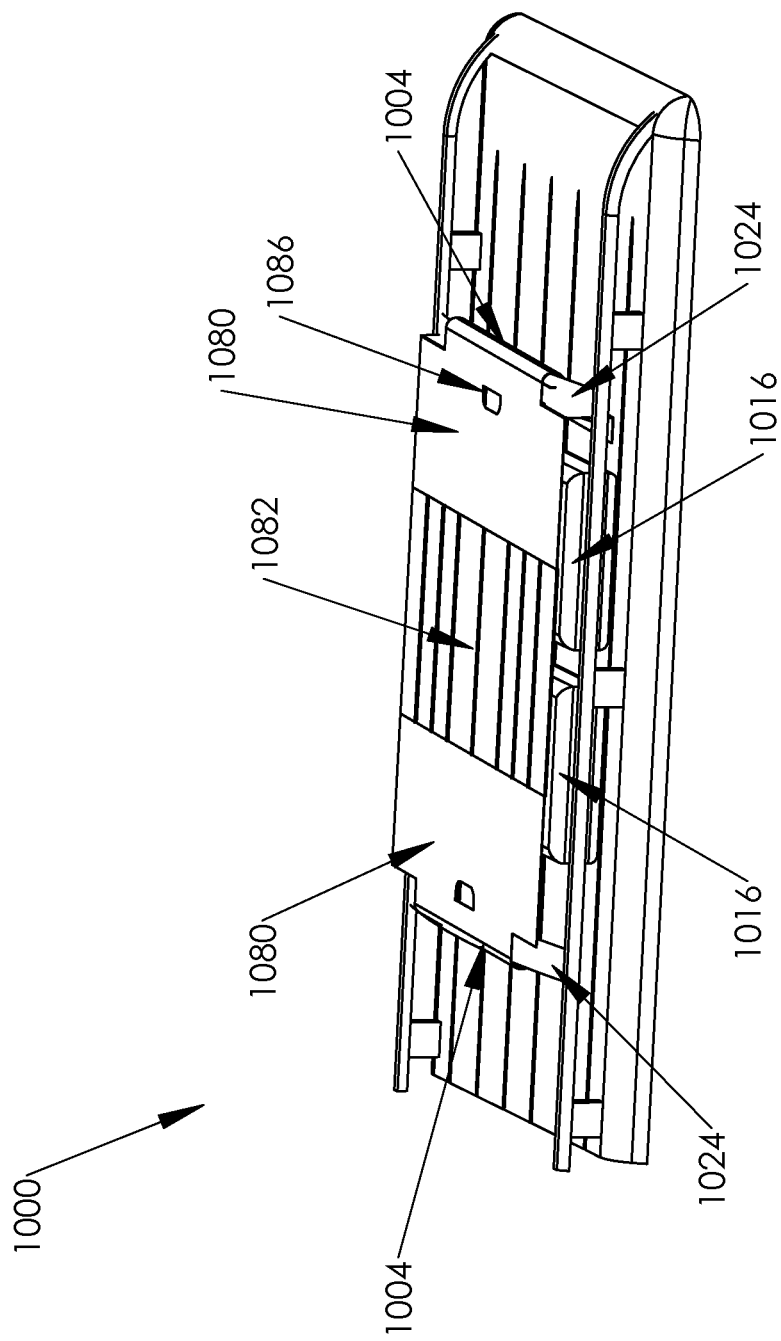
Figure 21:
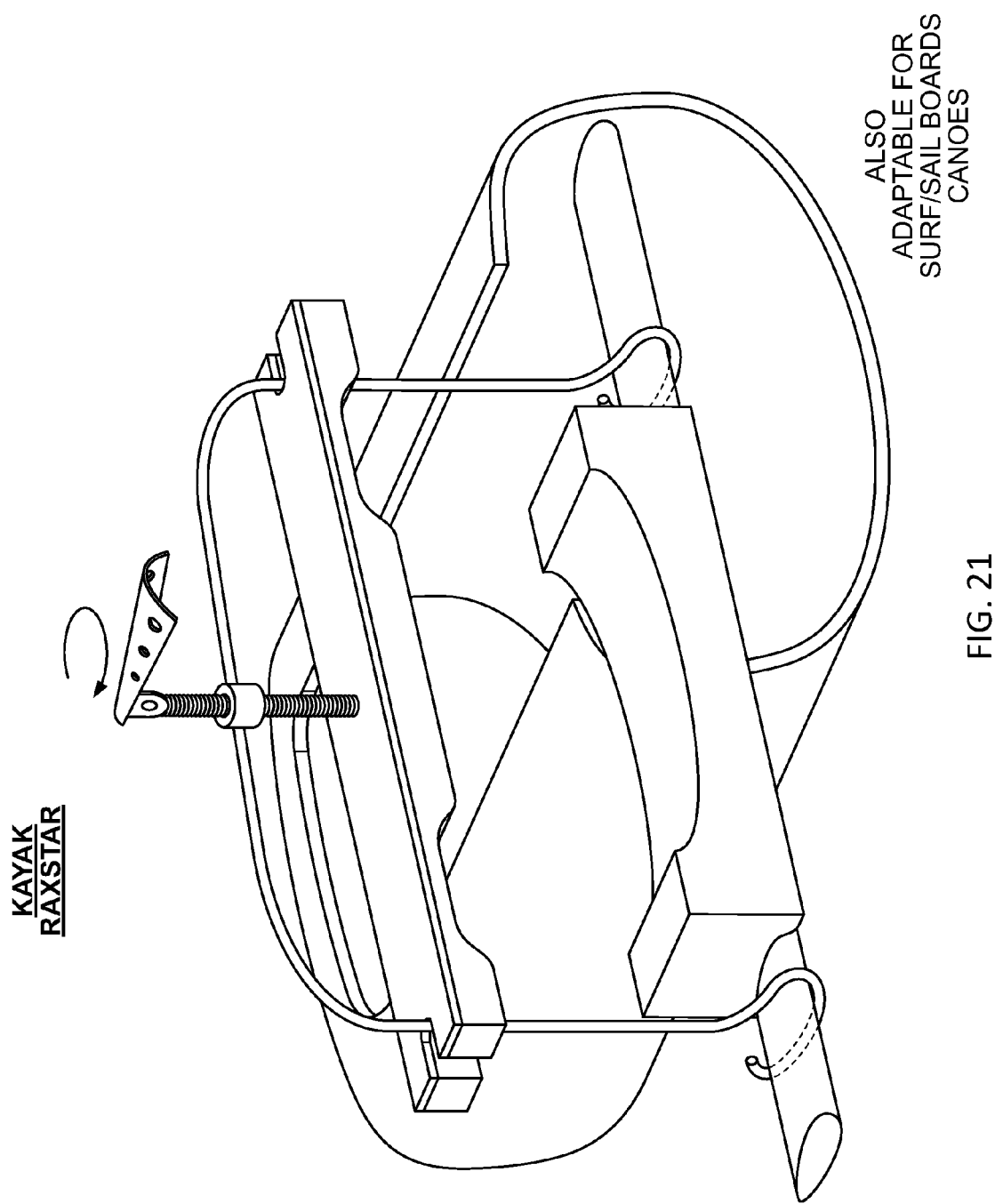
Figure 22:
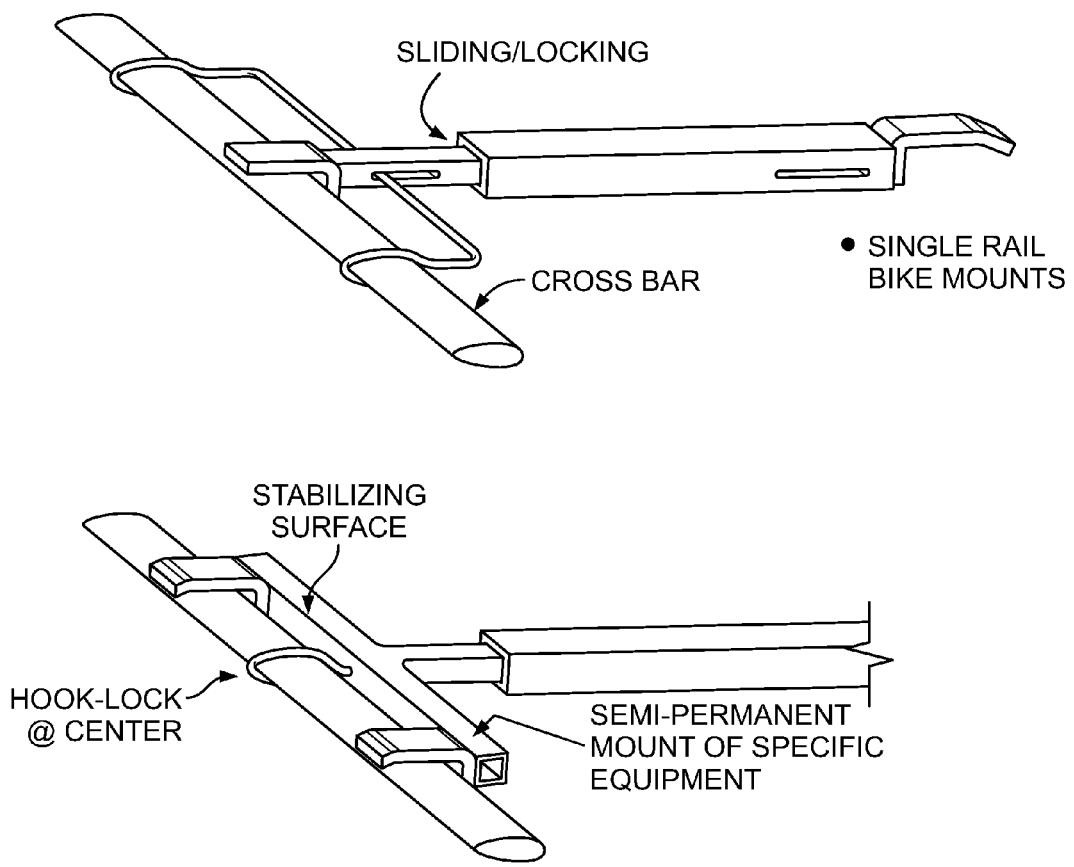
Figure 24:
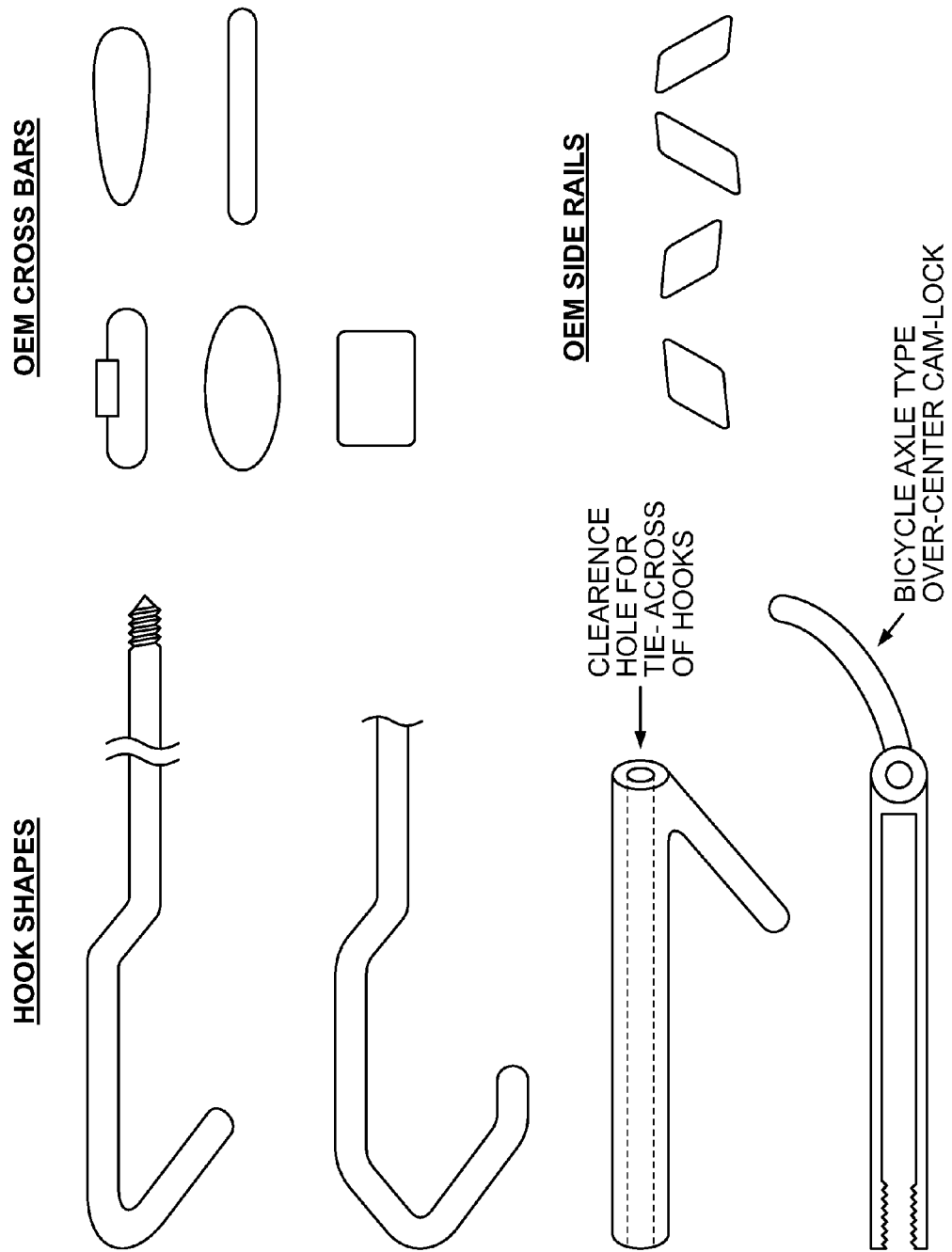
Figure 25:
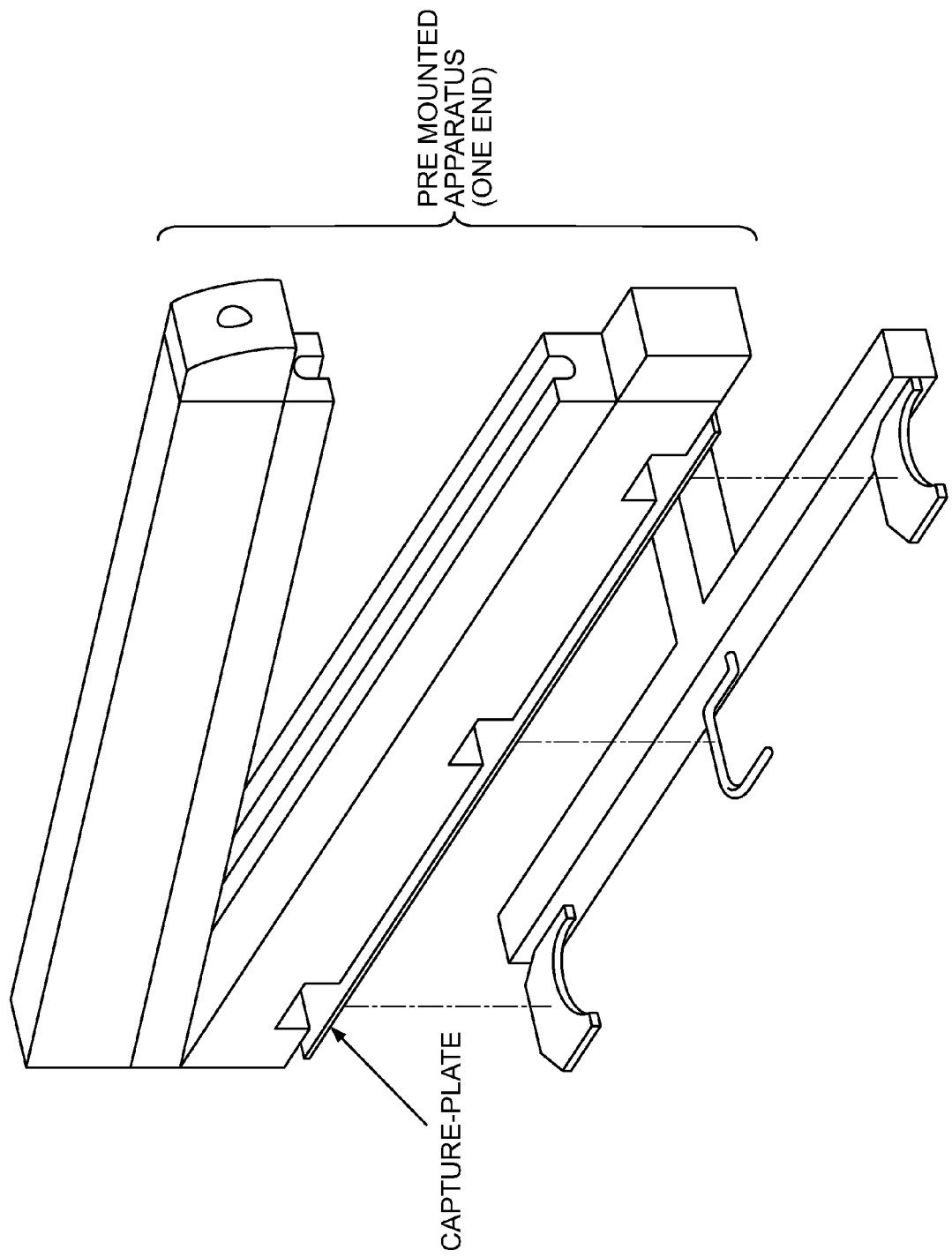
Figure 26:
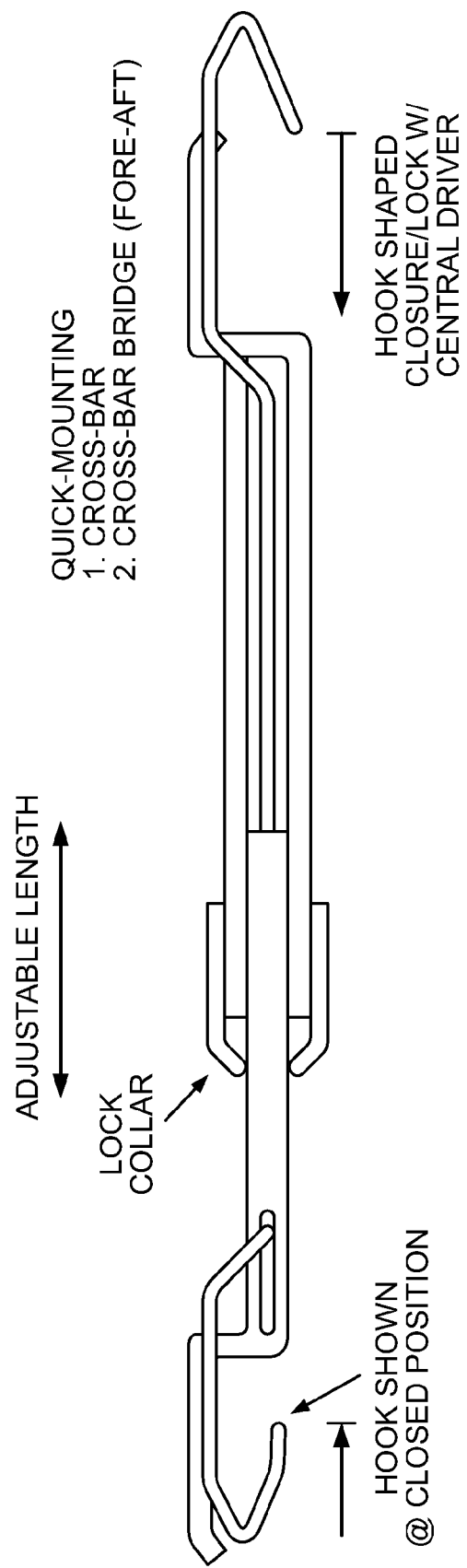

FIG. 4 includes various views of the components of the device shown in FIG. 2;

FIGS. 5A through 5C are respective perspective, side, top, and forward views of the device shown in FIGS. 2 and 3 and illustrating the device securing a pair of skis and poles to a crossbar of a vehicle roof rack;

FIGS. 6A and 6B are respective perspective and forward views of the device shown in FIG. 5 and illustrating the device securing the same pair of skis without poles to the crossbar of a vehicle roof rack;

FIGS. 7A and 7B are respective perspective and forward views of the device shown in FIG. 5 and illustrating the device securing a narrower pair of skis and a pair of poles to a crossbar of a vehicle roof rack;

FIGS. 8A through 8D are views of the device shown in FIGS. 5 through 7 with exemplary dimensions (in inches) provided for purpose of illustration only according to an exemplary embodiment;

FIG. 9 is a perspective view of an alternative exemplary embodiment of an adapter which may be used with vehicle roof racks that do not have crossbars but only include one or more side rails;

FIG. 10 includes perspective views of other alternative exemplary embodiments of clamping devices that may be used for securing multiple pairs of skis to a vehicle roof rack;

FIGS. 11A and 11B are perspective views of further alternative embodiments of devices or carriers for securing multiple pairs of skis and a single pair of skis, respectively, which devices include alternate locking members or clamping devices;

FIG. 12 is a perspective view of another exemplary embodiment of a device which may be used for securing a snowboard to a vehicle roof rack, which device includes a clamping device with a two-sided hooking apparatus;

FIG. 13 is a perspective view of the device shown in FIG. 12 securing a snowboard to the front and back crossbars of a vehicle roof rack;

FIG. 14 is a perspective view of the device shown in FIGS. 12 and 13 and illustrating an example padlock being used to prevent the handle from turning;

FIG. 15 is a perspective view of the device shown in FIGS. 12 through 14 and illustrating the handle in its fully folded position perpendicular to the threaded screw or rotational axis of the handle when cranked;

FIG. 16 is a side view of the device shown in FIGS. 12 through 15 and illustrating a snowboard being clamped and held between the device's footpad and the crossbar of the vehicle roof rack;

FIG. 17 is a perspective view of another exemplary embodiment of a device which may be used for securing a kayak (or canoe) to a vehicle roof rack, which device includes a clamping device with a two-sided hooking apparatus;

FIGS. 18A through 18C are perspective views of another exemplary embodiment of a device which may be used for securing a pair of kayaks to a vehicle roof rack which device comprises a double-sided hook with two prongs (FIG. 18A), and a two-piece cap (FIG. 18C) that is adjustable in width;

FIG. 19 is an upper perspective view of another exemplary embodiment of a device which may be used for securing or retaining luggage or other items within the space defined between the crossbars and side rails of a vehicle roof rack, which device includes hooks for attachment to the crossbars;

FIGS. 20A and 20B are upper perspective views of the device or luggage cover device shown in FIG. 19 and further illustrating the hooks, flaps, and springs which may be configured for inhibiting or preventing the device from accidentally detaching from the crossbars after being installed according to an exemplary embodiment of the present disclosure;

FIG. 21 is a perspective view of an exemplary embodiment of a device which may be used for securing a kayak (or canoe) to a vehicle roof rack, which device includes a single clamping device with a two-sided hooking apparatus, which device may also be adaptable for surf/sail boards;

FIG. 22 is a perspective view of an exemplary embodiment of a crossbar bridge (fastening/locking mechanism) that may be used to quickly mount equipment onto Thule/OEM cross bars, and also includes the following text: sliding/locking, crossbar, single-rail bike mounts, stabilizing surface, hook-lock at center, and semi-permanent mount of specific equipment;

FIG. 23 is a perspective view of an exemplary embodiment of a universal cross-bar, and also includes the following text: apparatus, separator, cross/side bar, sliding/locking, and other shapes for separator ends;

FIG. 24 includes examples of hook shapes, OEM cross bars, and OEM side rails, and also includes the following text: clearance hole for tie-across of hooks and bicycle axle type over-center cam-lock;

FIG. 25 is a perspective view of an exemplary embodiment of an apparatus shown pre-mounted at one end, and also showing a capture plate; and FIG. 26 illustrates an exemplary embodiment of a device, and also includes the following text: adjustable length, lock collar, quick-mounting, 1. cross-bar, 2. Cross-bar bridge (fore-aft), hook shown at closed position, and hook shaped closure/lock with central driver.

DETAILED DESCRIPTION

Example embodiments will now be described more fully with reference to the accompanying drawings.

Figure 18:
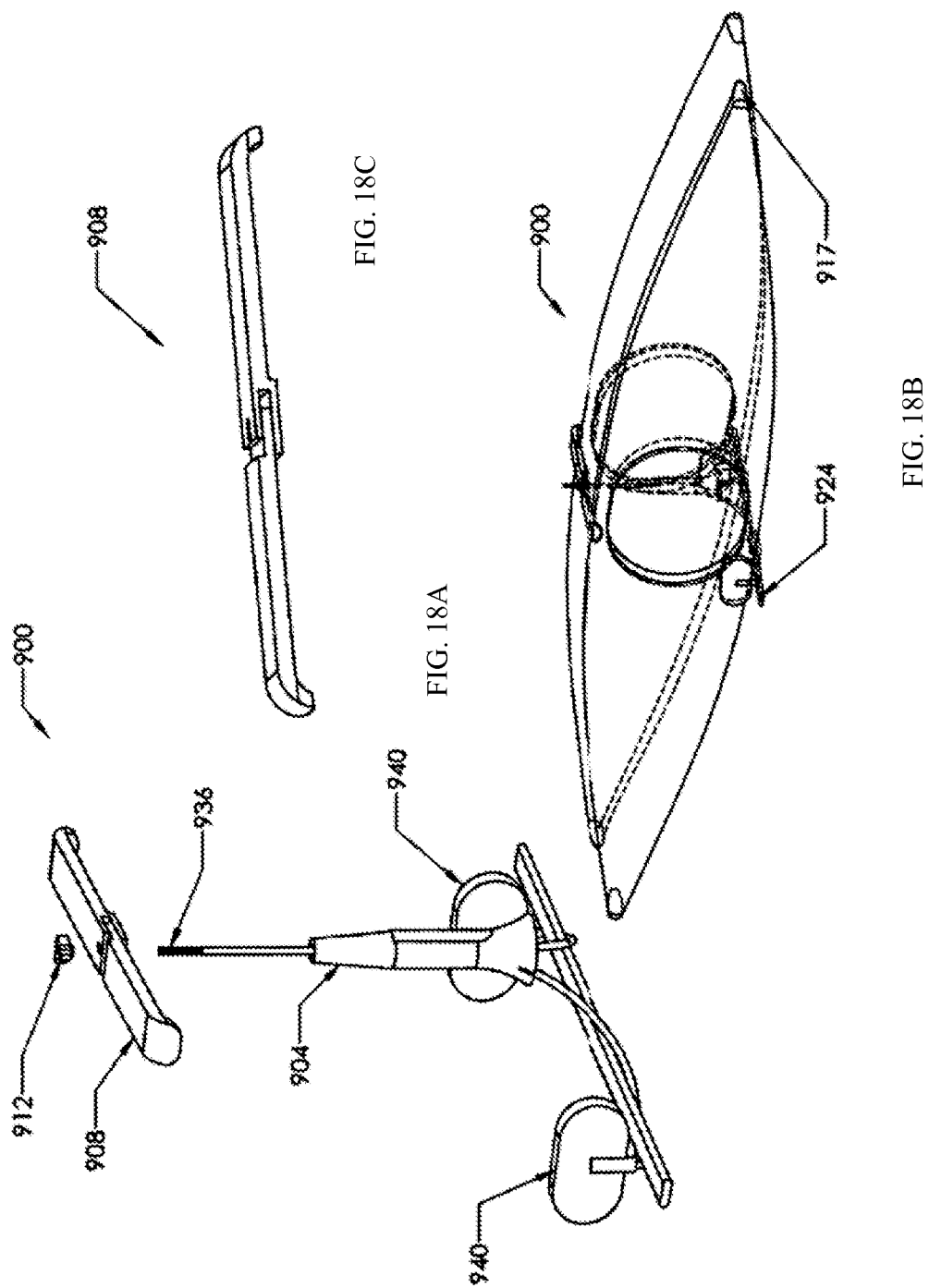

After recognizing how cumbersome and time consuming it may be to install and then later remove specialty adapters for skis, snowboards, etc., the inventor hereof has invented and discloses herein various exemplary embodiments of devices (e.g., device shown in FIGS. 1 through 8, devices shown in FIGS. 10, devices shown in FIGS. 11A and 11B, device shown in FIGS. 12 through 16, device shown in FIG. 17, device shown in FIG. 18, device shown in FIGS. 19 and 20, device shown in any one of FIGS. 21 through 26, etc.). These devices are securable or mountable to vehicle roof racks for securing items or articles (e.g., skis, snowboards, kayaks, canoes, luggage, etc.) to the vehicle roof rack. Further aspects relate to methods for attaching skis, snowboards, and other equipment to cross members, crossbars, or side rails of a vehicle roof rack and similar type apparatus or structures on a vehicle (e.g., car, truck, etc.). As disclosed herein, the inventor's devices may be securely mounted to a crossbar or cross member of a vehicle rack primarily by means of one hook or plurality of hooks, bracket or frame, and fastener, which may be constructed as one or more pieces. In use, the inventor's devices may be used to hold equipment directly to the cross members of vehicle roof racks. The inventor has also disclosed devices or adapters (e.g., FIG. 9, etc.) that may be adapted to mount on many roof racks that have side rails but no crossbars.

Accordingly, the inventor's present disclosure generally relates to devices that can be used in conjunction with vehicle roof racks (e.g., luggage racks, factory-installed racks, aftermarket racks, etc.), such as those having crossbars onto which skis, snowboards, or other equipment may be mounted for transportation. The inventor has disclosed herein devices that provide relatively simple and lower cost alternatives to conventional elastic bungees or other types of cords or straps that are commonly used to secure skis, snowboards, or other items to roof racks. The inventor has further disclosed compact brackets or adapters, which in various exemplary embodiments may be used to secure skis, snowboards, surfboards, kayaks, canoes, etc. to the rack cross member(s) or bar(s).

Exemplary embodiments of the inventor's devices may provide one or more (but not necessarily any or all) of the following advantages. For example, the inventor's disclosed devices may be relatively inexpensive to manufacture and relatively simple and quick to install and remove. The inventor's devices or carriers may be used to secure skis and ski poles, snowboards, and/or other equipment or gear (e.g., kayaks, canoes, surfboards, etc.) to most styles, shapes, and configurations of roof rack cross members, including OEM (original equipment manufacturer) racks and after-market racks for luggage, sports equipment, etc. As a further example, the inventor's carriers or devices may be configured to hold as much equipment as will physically fit on the cross member, as the inventor's carrier utilizes little to no horizontal space other than to separate the skis or other equipment and/or to be able to fit equipment in and around other previously installed carriers (e.g., additional carriers for the same sport or other sports, that may or may not be in use—thus avoiding the need to remove or uninstall a carrier for one sport and install one for another sport when alternating between those sports, etc.). The inventor's carriers or devices may allow for removal of a pair of skis, a snowboard, or any other single device without needing to remove or shift a second pair of skis or other equipment other than the pair of skis to be removed. Additionally, the inventor's carriers or devices are configured with the ability to expand the racking system to hold a combination of equipment (e.g. skis, snowboards, ski poles, etc.) using a related configuration or with the addition of a second adapter and added bracket. Because of its easy removal process, the inventor's carriers or devices are more likely to be removed and not be left installed on the roof rack when not in use, which, in turn, will reduce wind noise and drag caused by the rack. The inventor's carriers or devices may be configured to be highly compact when not in use, may be easy to uninstall and remove when not hauling a snowboard, skis, luggage, or equipment on the roof of a vehicle. The inventor's carriers or devices may also be configured as an adapter that may be combined with another bracket to secure skis and snowboards to roof racks that have only side rails and no crossbars. Additionally, the inventor's devices may be relatively compact such that they may be compactly stored (e.g., in a vehicle's glove box or glove compartment, etc.) as compared to other ski or snowboard racks or adapters that are larger and less compact. Further advantages that may be realized with the inventor's device include: tool-less installation and removal as no tools are required for installation or removal, short installation times (e.g., under one minute, etc.), short removable times (e.g., in seconds, etc.), widely applicable or usable on various roof racks with crossbars, fits one pair of skis with or without poles, built-in locking mechanism usable with standard padlocks, and/or unique aerodynamic configuration eliminate or at least reduces rattling.

Disclosed herein are exemplary embodiments of devices to secure skis (e.g., device shown in FIGS. 1 through 8, devices shown in FIG. 10, devices shown in FIGS. 11A and 11B, etc.) devices to secure snowboards (e.g., device shown in FIGS. 12 through 16, etc.), devices to secure kayaks (e.g., devices shown in FIGS. 17 and 18, etc.) and other equipment or luggage to or between cross members or crossbars of vehicle roof racks. Exemplary embodiments include an attachable hook or bracket that together with the skis secures the hook/bracket and skis together to the rack cross member. While the ski rack is configured to secure the skis to or with a cross member, the front-most cross member ("front" being determined by the front of the vehicle) is preferred for practical reasons. Unlike many racks, the inventor's devices include hook/bracket combinations which when secured with a fastener or other tightening/clamping means can tightly secure the skis, snowboard, etc., such that only one attachment point is needed to secure the equipment to the rack cross member. Although the inventor's hooks and brackets in his devices allow for the equipment to be tightly secured or clamped to one cross member, the inventor has also disclosed embodiments of clamping devices that include two hooks (e.g., J-shaped hooks, etc.) or two-sided hooking apparatus that attach at two points on the same crossbar. An elastic cord or strap (e.g., straps shown in FIGS. 1 and 12, etc.) may be secured to a second crossbar (e.g., rearmost cross member, etc.) at the other end of the skis or snowboard, so that the skis without the bracket does not bounce, shift, or rattle during transport. Except for the greater efficiency, lower cost, and less installation and removal time when using a single bracket, the end user may decide to nevertheless use two or more of the inventor's brackets instead of only one, where the multiple brackets may be used for securing the equipment to different cross members. The inventor's embodiments disclosed herein provide devices that are useful for securely anchoring skis, snowboards, kayaks, canoes, surfboards, luggage, or other items to the cross member.

As disclosed herein, an exemplary embodiment may include a curved rod or section (e.g., formed of metal, etc.) configured to be secured under a cross member by looping or hooking the hook section to the cross member, and then passing between the skis (with the skis bottom facing against one another) with a cap or bracket secured to the upper or straighter section of the hook. The cap or bracket may be a separate part that is attached to the hook, or it may be an integral part of a hook assembly. The cap or bracket is tightened with a screw knob or other means, which positively engages and secures the cap or top bracket to the skis and secures the skis to the cross member simultaneously via a screw on knob or other suitable means.

In another exemplary embodiment, the curved or hook section and the cap (e.g., U-shaped cap, etc.) are formed in one section or piece with the distal end of the curved or hook section having holes or other means through which a screw knob may pass to secure or tighten the assembly to accommodate various width skis and thicknesses (top to bottom) of cross members. But there can be many shapes and sizes for this cap to secure the skis by capturing them on the top edge and wrapping and capturing the sides (the sides of the skis is determined by the orientation and placement of the skis on the rack, such that as used in this paragraph the "sides" of the skis that are captured would be the top of the two skis).

An exemplary embodiment of a method generally includes hooking a bracket or rod under and around the cross member and then tightening the bracket or rod after passing between or around the skis. After being tightened, the bracket (e.g., T-shaped member, etc.) surrounds and positively captures the skis and the hook positively engages the cross member.

Exemplary embodiments may generally include a hooking or securing method with a bracket or hook. A threaded shaft (to which the fastener is secured) is centered over the bottom area of the hook and nearest the open end of the lower hooked section to reduce detachment due to shifting of the hook relative to the cross member (e.g., the pressure due to tightening will not encourage the hook to loosen or potentially detach from the cross member from load shifting, etc.).

Exemplary embodiments are disclosed herein that are configured for use with snowboards (or other similar shaped items, such as a surfboard, sail board and/or kayaks, canoes, etc.). In such embodiments, a clamping device or means for clamping is constructed of one part and has two hooks connected by a center span. The hooks are parallel and face in the same direction such that the clamping device would generally be hooked simultaneously around the same crossbar. A clamping mechanism/assembly is attached to the center span. The clamping mechanism/assembly may be comprised of a threaded rod and handle, which handle may be rotated to tighten and create a clamping force that secures the complete assembly to hold, for example, a snowboard, kayak, or other device to the crossbar.

In another exemplary embodiment (e.g., FIGS. 19 and 20, etc.), a "luggage cover" is provided that may be used to secure or hold down luggage or other items against the roof between the crossbars. This "luggage cover" or hold-down device in an exemplary embodiment is comprised of two rigid cover sections connected by a flexible or expandable section. At the two ends (the sides farthest from the flexible center section), hooking devices are provided. The luggage cover or hold-down device may be installed to securely hold luggage on the roof of the vehicle between the crossbars. It would be installed by hooking the device onto the front crossbar then stretching it and also hooking it to the rear crossbar. In this stretched configuration, the tension and positive locking elements (in some embodiment) prevent or inhibit the hooks from accidentally releasing from the crossbars. In turn, this also keeps the luggage held down and prevents or inhibits the luggage from moving from front to back by the crossbars. Other elements may be incorporated, for example, to positively lock the device in place to avoid accidental or wind turbulence-driven removal of the cover, such as by including a front cover or flap to keep or reduce direct air-flow, rain or road spray off the luggage or from passing under the cover. Other exemplary embodiments have been configured specifically for kayaks, canoes, bicycles, and other items—to be secured to generally any standard factory or sports rack crossbar.

Disclosed herein are exemplary embodiments of various rack adapters or devices attachable or securable along with articles such as sports equipment (e.g., skis, snowboards, kayaks, canoes, surfboards, etc.), luggage, etc. to cross members or side rails of a vehicle roof rack. When attached, the device and articles are held securely and positively engaged with one attachment point which articles can be further secured with a strap, cord, or other similar device to another attachment point provided by another cross member or side rail of the vehicle roof rack. In exemplary embodiments, a device includes a hook, cap (e.g., FIGS. 1 through 8, etc.) or T-shaped part (e.g., FIGS. 10, 11A, 11B, etc.) and a knob and, as needed, a spacer to also hold ski poles. Other exemplary embodiments include two J-shaped hooks connected by a cross span (e.g., device shown in FIGS. 12 through 17, etc.). A threaded bolt (or other suitable fastener or clamping means) is located at the center of the cross span, for securely tightening or clamping onto the snowboard, etc. Another exemplary embodiment (e.g., FIGS. 19 and 20, etc.) is configured with two hooks secured to two panels that stretch across the roof rack. The panels are oriented in the horizontal plane and the hooks (instead of hooking under the crossbars) hook on the outside of each crossbar. The hooks are then tightened towards the center or towards one another with spring tension or other means. Exemplary embodiments of the present disclosure are configured for use and to adapt to most crossbars and racks and even, with the inclusion of an additional device, in some cases, to racks with no crossbars and only side rails. The inventor's devices do not require separate installation prior to securing the sports equipment or luggage (or more broadly, article). Thus, the inventor's devices are readily removable when not in use, thus allowing them to be removed readily to thereby avoid wind noise and resistance.

Exemplary embodiments disclosed herein may be constructed to fit varying sizes and shapes of cross members, bars, rails, frames, and racks in general. Additionally, such embodiments can be constructed so as to be adjustable for skis having different widths, snowboards, multiple skis, kayaks, or other equipment (e.g., bicycles, canoes, luggage, etc.) in combination with a variety of configurations of rack crossbars or cross members.

Various embodiments include means for quickly and easily securing and later removing skis, snowboards, etc. to cross members, bars, rails, frames, and racks on vehicle roofs. The embodiments and methods permit securing a ski adapter or device along with the skis, snowboard, etc., to the cross member in one step, as opposed to a multi-step process of securing the adapter to the cross member and then securing separately the skis to the adapter. Such is facilitated through the inventor's unique approach of having the skis become an integral component of securing the adapter and ski combination to the cross member, such that without the skis, the adapter alone would not as easily be secured (nor is intended to be necessarily) tightly to the cross member.

Figure 1:
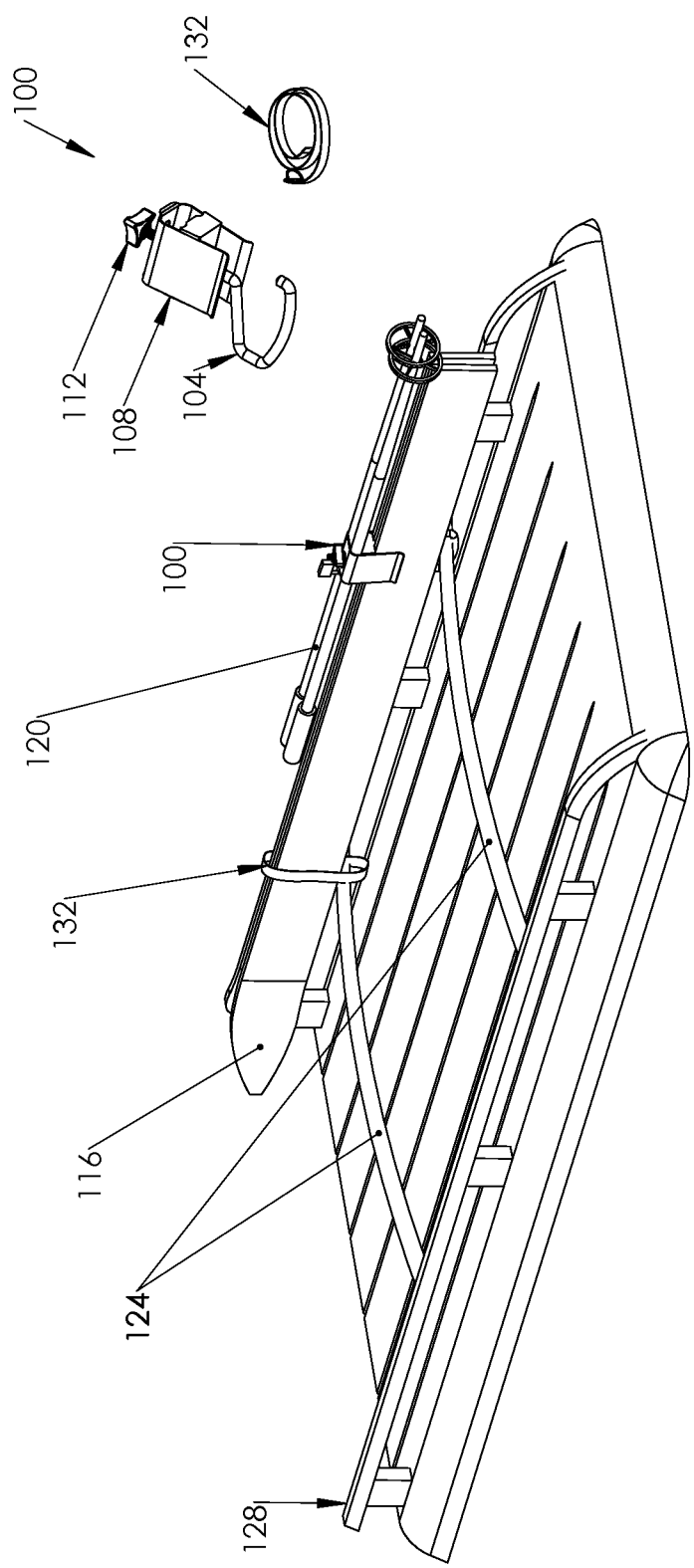
FIG. 1 is a perspective view of an exemplary embodiment of an adapter or device shown securing a pair of skis and poles to a roof rack of a vehicle.

With reference now to FIGS. 1 through 8, there is shown an exemplary embodiment of a device or adapter 100 embodying one or more aspects of the present disclosure. The device or adapter 100 includes three primary components, which are a hook component 104, a cap 108, and a knob 112. As shown in FIG. 1, the hook, cap, and knob 104, 108, 112 may be used for securing a pair of skis 116 and optionally a pair of poles 120 to the crossbars 124 of a vehicle roof rack 128. In this embodiment, the device 100 together with the skis 116 operate to secure the skis 116 and device 100 to the front cross member 124. Also shown in this exemplary embodiment in FIG. 1 is a strap 132 or other similar securing means or device for securing the skis 116 to the rear cross member 124.

As shown in FIG. 2, the hook component 104 includes an upper straight portion 136 that is threaded. The knob 112 includes an internally threaded hole such that the knob 112 may be rotatably threaded about the threaded upper portion 136 of the hook component 104. The hook component 104 also includes a lower curved portion 140 such that the hook component 104 has a J-shaped configuration or is shaped similar to an upside down question mark. In this example, the straight/vertical upper section 136 of the hook component 104 is close to or nearly directly above the lower end of the elongated curved lower section 140 as shown in FIG. 4. This vertical positioning reduces potential loosening and detachment of the adapter or device 100 and skis 116 due to shifting or slipping of the hook component 104 relative to the cross member 124 after installation.

In this exemplary embodiment, the device 100 and skis 116 are securable to the cross member 124 with the curved J-shaped portion 140 of the hook component 104 capture the cross member 124 after passing between the bottoms of the skis 116. The cap 108 may be slid downward onto and along the straight threaded portion 136 of the hook component 104 so as to capture or surround all or a portion of three sides or surfaces of the pair of the skis 116 as shown in the figures. As shown in the FIG. 5C, the skis 116 are disposed between the sidewalls 144 of the cap 108. This exemplary method of securing the skis 116 to the crossbar 124 captures the skis 116 as they rest on their side edges with the generally U-shaped cap 108 covering the opposite top or side edge and the two sides of the U-shaped (cross sectional profile) covering a portion of each ski's top surface.

The knob or other fastener 112 may be used to positively secure the skis 116 and device 100 together to the cross member 124. In this example, the knob 112 is threaded onto the threaded portion 136 of the hook component 104 to create a clamping force for securely retaining the skis 116 and device 100 to the cross member 124. The opposite or rearmost end of the skis 116 may be secured similarly with a second device 100, if desired or preferred. But because of the positive capture and method of tightening the adapter/device 100 and skis 116 securely to the front cross member 124, the other end of the skis 116 may instead be attached to the rear crossbar 124 with only a strap 132, bungee, or other similar device. Note that the terms rear and front or other orientation is determined by the orientation relative to the car as skis may be mounted to a vehicle roof rack with the front tip of the skis facing towards the rear of the car or vice versa.

Figure 8D:
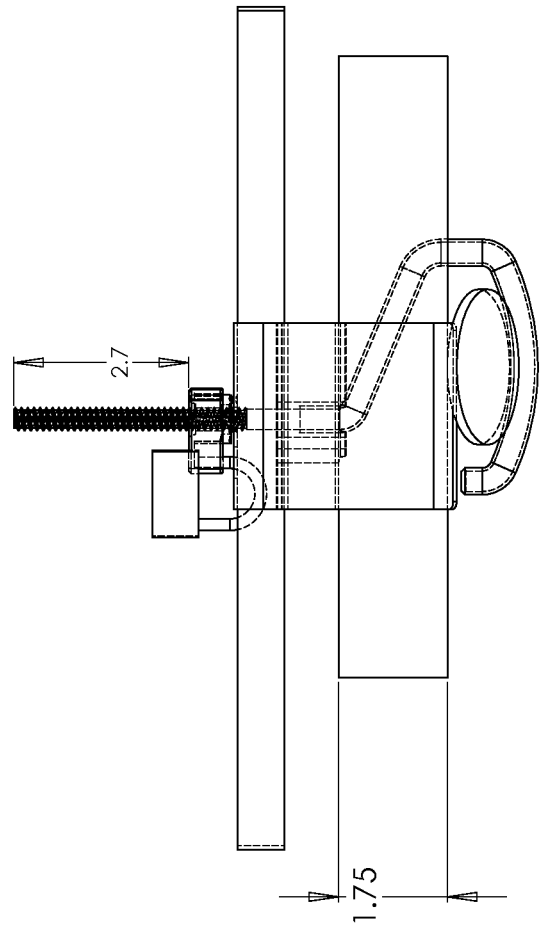
Figure 8C:
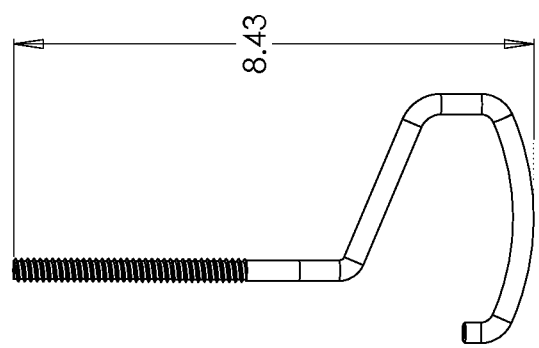

As shown in FIGS. 8A and 8D, the hook component's lower curved portion 140 may be configured (e.g., shaped, sized, curved, etc.) such that it corresponds with or matches the profile of the crossbar 124 to which it will be installed. The hook component 104 is configured to create a low point or cradle where the crossbar or attachment point would tend to settle (at the bottom of lowest point of the curve), thus reducing the probability that the ski adapter or device 100 shown in FIGS. 1 through 8 will loosen after being installed with the skis 116 to the rack 128.

As shown in FIG. 4, the top or upper portion 148 of the cap 108 includes a hole pattern with first and second holes 149, 150. These holes 149, 150 are configured to respectively receive therethrough the upper straight section 136 of the hook component 104 and the bar section of the padlock 152.

In addition, the cap 108 has a generally inverted U-shaped profile cooperatively defined by the cap's sidewalls 144 and top portion 148. As shown in FIG. 4, the sides 144 of the cap 108 are tapered or angled inwardly relative to the top portion 148 such that the space between the sides 144 narrows. The sides 144 curve outwardly near their distal ends, thus enabling the cap 108 to snuggly or frictionally hold or grip a variety of thicknesses of skis while avoiding a loose fit of the sides 144 against the top surfaces of the skis 116 (which in their installed position this would be the sides of the assembly). The curved end portions or tips of sides 144 of the cap 108 also help to avoid scratching the skis 116, while making it easier to slide the cap 108 over skis that are wider than the narrowest at rest width between the walls 144 of the cap 108.

FIGS. 8A through 8D provide exemplary dimensions of the device 100 for purposes of illustration only and not for purposes of limitation as other embodiments may be sized differently than what is shown in FIGS. 8A through 8D. By way of further example, the hook component 104 may have a height from about 7 inches to 9 inches tall and a width from about 2.5 inches to 3.5 inches as measured horizontally across the lower curved section 140. In this example, the hook component 104 may create an aperture or opening to accept a crossbar up to 1¾" or more thick or tall, and the hook's threaded straight section have a height from 2 inches to 4 inches or more. In this example, these dimensional size configurations will help ensure that the device or adapter will be useable with most crossbars on luggage, sport and other roof racks and with a wide range of different brands, shapes, and sizes of skis.

A wide variety of materials may be used for the components disclosed herein. For example, the cap 108 and/or hook component 104 may be constructed of or made of steel, aluminum, other metals, molded plastic, or other similarly rigid and strong materials (such as nylon, fiberglass, etc.). In embodiments in which the hook component is made of steel or similarly hard material that would scratch skis, the hook component is preferably coated or dipped in plastic, rubber, flexible PVC, or other relatively soft material in order to reduce scratching that might occur when the hook component 104 contacts the bottoms or underside of the skis 116 during use. In other embodiments, the hook component may be made of a softer but rigid enough material that would not scratch the skis 116 during use even when the hook component is not coated with rubber, plastic, etc.

With continued reference to FIGS. 1, 2, 3, and 5A, the cap 108 is configured to be engaged or locked by the lock 152. As shown in FIG. 4, the cap 108 includes the additional hole 150 in the top surface 148 for receiving the bar or loop portion of the lock 152 or similar type of locking mechanism. As shown in FIGS. 1, 2, 3, and 5A, this additional hole 150 is configured for use with the padlock 152 as the padlock's loop or bar section passes and loops through the hole 150. The placement of the hole 150 and the configuration of the knob 112 would cause the lock 152, when installed, to be operable for preventing rotation and (thus removal) of the knob 112. This, in turn, would thus also prevent the removal of the cap 108 and skis 116. In exemplary embodiments, either or both of the holes 149, 150 in the top 148 of the cap 108 may be off center, such as to allow the lock 152 to be more easily secured.

The combination of skis 116, J-hook component 104, U-shaped cap 108, and knob 112, when installed (with or without the option ski poles 120) create a clamping and vice-like securement or system, which positively engages and permits significant tightening of the integrated unit and which is substantially more secure and resistant to shifting caused by wind and air flow than other conventional ski rack adapters or devices for securing skis to vehicle roof racks. Because the inventor's J-hook component 104 separates the skis 116, the cap 108 contains the skis 116 on the outer edges creating an opposing, side-to-side force. Additionally, the skis 116 are contained vertically with opposing forces by the crossbar 124 and cap 108. Both connections and these opposing forces reduce any play or range of motion of the skis 116 relative to the adapter/device components 104, 108, 112 and crossbar 124, and specifically in the vertical plane. Moreover, this may be accomplished with the inventor's devices with great or significant force when the knob is tightly secured. This advantageously inhibits or prevents the skis from sliding rearward due to wind and air resistance that tends to push skis rearwards.

In addition, many skis are now parabolically shaped and have tips wider than their center section, which center section is also where the boot bindings are mounted. As shown in FIG. 1, the inventor's adapter/device 100 is not clamped about the widest part (or tip) of the skis 116. This means that these skis 116 cannot slide backwards as the wider tips would not fit or slide into the aperture created by the clamped cap 108, skis 116, and crossbar 124. Thus, the skis 116 (and poles in a similar manner) are positively clamped in place with very little range of motion for this additional reason as well as from the high amount of friction and pressure from the tightened knob 112 which precludes motion of the skis 116 relative to the J-hook component 104, cap 108, and crossbar 124.

With further regard for the cap 108, exemplary embodiments may include the cap having sides of various curves similar to adapt to various ski configurations and alternate top hole patterns. When viewed in its installed position, the sides of the cap 108 may curve inward and narrow so that the widest point or cavity/opening to accept the skis and/or poles is at the top of the cap 108. The sides would narrow from there (moving toward the ends) and near where the sides end they curve outwards. This combination of narrowing sides with a slight curved tip permits the cap to be installed onto a wider range of thicknesses of skis. In its at rest position, an exemplary embodiment of cap may be dimensionally sized such that it is about 2 inches wide at the top (closed end) and narrows to a width of about 1 to 1.5 inches at the cap's distal ends. When being installed on skis that, together with the J-hook component installed are 1.75 inches wide, the curved tips thus help facilitate the cap being installed without scratching the skis and help push the cap tips open wider to flex the cap open to accept the skis and J-hook component that are wider than the narrow end of the cap is when in its at rest or un-flexed position.

As shown in FIGS. 2, 3, and 4, the illustrated exemplary embodiment of the device 100 also includes a spacer 160. The spacer 160 may be used to allow the device 100 to more easily accommodate securing ski poles 116 or similar equipment along with along with and on top of the skis 116. For example, and as shown in FIG. 5C, the spacer 160 may be used to enable the ski poles 120 to be secured on top of the skis 116 without unduly crushing the pole handles, pole baskets, or the ski break bar. The spacer 160 may thus be configured to permit the collective components and racks to be secured more reliably when the knob 112 is tightened.

As shown in FIG. 4, the spacer 160 includes a shaped top having two partial curved sections or grooves 162 on opposite sides of the center hole 164. These grooves 162 extend along the length of the spacer 160. The grooves 160 are configured to receive or accept the ski poles 120 on top of the upper surface of the spacer 160 and cradle the ski poles 120 securely. The spacer 160 also provides a relatively level point of contact if the spacer 160 is used without the poles as shown in FIG. 6B. The spacer 160 also has a corresponding center hole 164 which aligns with the hole 149 in the cap 108 to receive therethrough the threaded straight portion 136 of the hook component 104. The spacer 160 also includes an opening or notch 166 that accommodates for and allows the loop or bar section of the padlock 152 to be positioned or installed therethrough.

The spacer 160 is also shown with a ridge 168 along the length of the bottom edge which ridge is roughly similar in length to the cap 108). The ridge 168 is slightly wider than the exposed thread area of the J-hook component 104 such that the ridge would fit between each ski and reduce the likelihood that the underside or edge of the ski would contact the threads and damage the ski. The spacer 160 would be particularly useful when hauling wider skis and/or when the device 100 is attached to a thicker crossbar as more of the hook component's threads would be exposed between the skis adjacent to the ski bottoms in these situations. The spacer reduces (and may eliminate) the potential for wear and tear on the skis from rubbing or bumping against the threads when the skis are being secured to the vehicle rack with the device 100.

The spacer 160 may be constructed from rubber, dense closed-cell foam (e.g., polypropylene, etc.) or other similar compressible material that permits compression of the spacer 160 when the knob 112 is securely tightened. The compression of the spacer 160 also functions like a lock washer with regard to further reducing the risk of the tightened knob 112 working loose.

FIG. 9 illustrates an exemplary alternative embodiment of an adapter or device 200 embodying one or more aspects of the present disclosure. The device 200 is configured such that it may be used with vehicle roof racks that do not have crossbars, but instead have side rails such as near the rain gutters on the sides of the roof). This side rail adapter 200 provides for a bar 270 and a hole 271. In use, a hook component (e.g., hook component 104 shown in FIG. 2, etc.) may be hooked under, into, or through the hole or channel 271 in lieu of hooking under a crossbar of the vehicle roof rack. The adapter 200 also includes a channel 272 on the bottom to accommodate the side rail 273.

The side rail adapter 200 is intended to be secured directly to one of the side rails near or on either side of the top of the rail. The side rail adapter 200 may be fastened to the side rail 273 with a clamp, strap or other fastener device (e.g., a hose clamp, etc.) such that the device 200 is secured tightly to the side rail 273. The skis or snowboards and the side rail adapter 200 may be installed in a manner similar to that disclosed above when a crossbar is used and tightened against the installed loop (side rail adapter 200). Various means by which the adapter itself could be locked to the side rail for security may also be employed.

For snowboards, the side rail adapter 200 has "wings", tubes, or similar (removable or not) extensions to enable snowboards and similarly wider objects, to be secured, for example, with a device 700 as shown in FIGS. 12 through 16. For example, this particular illustrated adapter 200 includes notches 274 in the rod or bar 270 that, for example, the two J-hooks 704 (FIGS. 12-16) would be secured under the rod or bar 270. The notches 274 or similarly-functioning features would prevent or at least inhibit the J-hook components 704 from sliding side to side (horizontally). For skis, the side rail adapter 200 includes slots 275 along the length of the top of the adapter 200. Each ski would be positioned atop the adapter 200 in a different one of the slots 275.

FIG. 10 includes perspective views of other exemplary embodiments of devices or adapters 300 and 400 that may be used for securing a pair of skis 316 to a cross bar or cross member 324 of a vehicle roof rack. The devices 300, 400 may be configured to further simplify the installation process and/or further reduce the amount of time needed to install the devices 300, 400 for securing the pair of skis 316 to the vehicle roof rack. This may be accomplished by reducing the number of parts to assemble. As shown in FIG. 10, the function and operation of the cap and hook component are essentially integrated into a single, integral part or piece having a generally T-shaped connector or cap 308 at one end and hook portion 304 (e.g., generally J-shaped or U-shaped hook portion, etc.) having a threaded end portion 336.

FIG. 10 also illustrates an exemplary knob 312 configured to be threaded onto the threaded end portion 336 of the hook portion 304. Alternative embodiments may include a knob having a built-in washer or a cap-type washer (e.g., similarly but smaller than U-shaped cap 108, etc.) so as to allow the knob 312 to be tightened against the upward-facing side edges of the installed skis 316.

In the exemplary embodiment shown in FIG. 10, the hook portion 304 is slidably moved or slid between the skis 316 and under the crossbar 324, and then back up through the skis 316 on the opposite side of the crossbar 324. The hook portion 304 is then secured on the opposite side of the crossbar 324 by threading the threaded knob 312 onto the threaded end portion 336 of the hook portion 304 to tighten the skis 316 and/or poles to the crossbar 324. This similar process may be used with the alternative embodiment of the device 400, except that a locking pin may be inserted into the corresponding one of the openings 437 to tighten the skis and/or poles to the crossbar.

Alternative embodiments may include a flexible hook portion functioning in the similar manner as the hook components disclosed above, such as hook component 104. The flexible hook portion may be sufficiently flexible (e.g., formed from one or more strap, etc.), such that the flexible hook portion may be wrapped around a crossbar and then be secured to a cap, such as a cap similar to cap 108, etc. Also, a similar one-part clamping embodiment could be made with a hinged J-shaped hook member or hooking member with a curved section.

FIGS. 11A and 11B are perspective views of further alternative embodiments of devices or carriers 500, 600 embodying one or more aspects of the present disclosure. The device 500 may be used for securing multiple pairs of skis to a vehicle roof rack with a single tightening apparatus (FIG. 11A). The device 600 (FIG. 11B) may be used for securing a single ski or single pair of skis to a vehicle roof rack. These devices 500, 600 each include alternate locking members or clamping devices which may be referred to herein as "T" adapter or "T" connector. FIG. 11B illustrates an individual clamping member configured for one pair of skis, but a plurality of these clamping members may also be mounted on a large housing (e.g., FIG. 11A, etc.) for securing a corresponding number of pairs of skis.

As shown in FIG. 11A, the device 500 includes multiple channels or slots 575 for skis and/or poles. Also shown in FIG. 11, the device 500 may be used with the device 700 illustrated in FIG. 12. In such example use, the device 500 may be mounted or coupled to the frame of the device 700. In which case, the device 500 may then be used along with the device 700 to secure or clamp multiple pairs of skis to a vehicle roof rack. Likewise, a number (one or more) of clamping members like the clamping member shown in FIG. 11B may also be used with device 700 to secure or clamp a corresponding number of pairs of skis or poles to a vehicle roof rack.

FIGS. 12 through 16 illustrate another exemplary embodiment of a device 700 embodying one or more aspects of the present disclosure. As shown in FIG. 13, the device 700 may be used (e.g., with a strap 732, etc.) for securing a snowboard 716 (or similarly shaped item such as surfboard, wakeboard, surf sail, etc.) to one or more crossbars or cross members 724 of a vehicle roof rack 728. The various devices disclosed herein may be used for securing a wide variety of articles and sports equipment to vehicle car racks.

As shown in FIG. 12, the device 700 may comprise a single piece main frame member 702 having hooking portions 704 at each end. The shape of these hook portions 704 may be similar in side profile shape as the corresponding lower half portion of the hook components 104 described above. Generally, the hook portions 704 may be configured (e.g., shaped, sized, curved, etc.) such that it corresponds with or matches the profile of the crossbar 724 to which it will be installed. The hook portions 704 may be configured to create a low point or cradle where the crossbar or attachment point would tend to settle (at the bottom of lowest point of the curve), thus reducing the probability that the device 700 will loosen after being installed with the snowboard 716 to the rack 728. As noted above, this single piece frame 702 having the hooked end portions 704 may be combined with the locking devices shown in FIGS. 11A and 11B in other embodiments.

With continued reference to FIGS. 12 through 16, the device 700 (which may also be referred to as a snowboard adapter or carrier) includes the double hook portions 704 connected by a center span 705. The device 700 also includes a tightening apparatus comprised of a handle 707, a threaded rod 736, and a footpad 737. The footpad 737 may be configured to swivel so as to avoid scratching the snowboard 716 as the handle 707 is rotated while tightening.

As shown in FIG. 14, the handle 707 may be folded downward to hold the device 700 in place. The handle 707 may also be secured to the center span 705 and locked in place by a padlock 752. In this exemplary manner, the handle 707 may thus be folded downward to enable it to be folded into a storage or travel position and/or to deter inadvertent unwinding or loosening, and/or also enable locking as shown with a padlock 752. The handle 707 may also include a plurality of openings 709 to permit locking with the handle 707 in one of several positions).

FIGS. 15 and 16 illustrate the device 700 with the handle 707 folded in an alternate (or fully folded position). A spring mechanism is built into the handle 707 in this exemplary embodiment. The spring mechanism bends and adds spring pressure for keeping the handle 707 in the fully folded position. The spring mechanism may also help or provide support for keeping the handle 707 in a 90° horizontal "cranking" position. Applying spring force to the handle 707 in this fashion may make cranking or turning the handle easier as the user may thus avoid the need to hold the handle 707 upwardly in the cranking position while turning. In some embodiments, this may enable turning with one finger, etc.

With continued reference to FIG. 16, this illustration shows the device 700 in its installed position while supporting or securing the snowboard 716 to the crossbar 724 of the vehicle roof rack. As shown in FIG. 16, the handle 707 is in its fully folded position which is ninety degrees from its "rotating" or "cranking" position in this embodiment. In this folded down position, the handle 707 is prevented from accidentally loosening and is held in position by both gravity and the built in handle spring.

This exemplary embodiment of the snowboard adapter 700 shown in FIGS. 12-16 is held in place by the constrained space between the crossbar 724 and footpad 737 of the tightened clamping device. Once clamped, the upward curve of the tips or end portions of the snowboard 716 prevents or at least inhibits it from sliding backward relative to the footpad 737 and the boot bindings prevent the snowboard 716 from sliding forward. The hook portions 704 of the device 700 also prevent or inhibit any significant side-to-side motion of the snowboard 716 as the space separating the hook portions 704 may be only marginally wider than the snowboard 716). Thus, the snowboard adapter or device 700 may also create vertical clamping force against a crossbar via a threaded portion and rotatable knob while the snowboard is confined laterally in a contained space thereby securely holding and clamping the snowboard.

Alternative embodiments of the snowboard adapter or device may include one or more hook portions and a connecting bar/center span section that are connected on one side or hinged and tightened in various alternative ways. Such alternative embodiments may, however, still employ the same or similar clamping functions or operations provided by way of a pair of hooks and opposing pressure through a clamping or vertical force applied close to the vertical line above and onto the crossbar (or nearly so).

FIG. 17 illustrates another exemplary embodiment of a device 800 embodying one or more aspects of the present disclosure. As shown, the device 800 is being used (e.g., along with a strap 832 and pads 833, etc.) to secure a kayak 817 to the crossbars 824 of the vehicle roof rack 828. As with the device 700, the device 800 also includes a clamping device with a two-sided hooking apparatus, a footpad, a threaded portion, and handle. The device 800 may also be used for securing other items besides the kayak 817, such as a canoe, etc.

The kayak adapter or device 800 may comprises two functions that work together to secure equipment, etc. to the two rack crossbars 824. That is, the device 800 may include hooking members or pair of hooks that are secured under or around one crossbar and a second device (e.g., strap 832, etc.) that secures to the second crossbar 824. A function of the strap 832 is to prevent the rear portion of the kayak 817, skis, snowboard, etc., from bouncing, vibrating, or moving against the rear crossbar. The strap 832 may also reduce the likelihood of the secured device (e.g., kayak 817 in FIG. 17, etc.) from sliding side to side, relative to the rear crossbar 824. Thus the hook-based clamping device on the front crossbar 824, when tightened, tends to positively engage and hold the device to the front crossbar 824 while the strap 824 helps to more effectively secure the device to the crossbars 824.

FIGS. 18A through 18C are perspective views of another exemplary embodiment of a device 900 embodying one or more aspects of the present disclosure. As shown, the device 900 may be used for securing a pair of kayaks 917 (FIG. 18B) to one or more crossbars 924 of a vehicle roof rack. This exemplary device 900 includes a double-sided hook member 904 with two prongs 940 (FIG. 18A) and a two-piece cap 908 (FIGS. 18A and 18B). The cap 908 is slidably adjustable in width by moving one of the two pieces relative to the other. The device 900 also include a knob 912 that may be threaded onto the threaded end portion 936 of the hook member 904 that extends out of the hole in the cap 904. The kayak adapter or device 900 may function similarly to the device 100 described above, though the device 900 may be larger in scale and dimension in order to secure two kayaks 917 with one clamping device 900.

As shown in FIG. 18A, the J-hook portion 904 includes a double J-hooks or prongs 940 such that each hook end functions to snuggly hold and prevent the bottom edge of the kayaks 917 (the side rail facing down in the installed position shown in FIG. 18C) from sliding outwards while in transit and/or to help protect against theft. As represented by the arrows in FIG. 18A, the tips of the J-hooks or prongs 940 may be adjustable to enable them to protrude into the seat opening or cockpit of the kayak (or recessed area for the seat) to better secure the kayaks 917. In some embodiments, a possible clamping member may be provided to enable the J-hook component to be held in place on the crossbar 924 and upright prior to or during the positioning/securing of the kayaks 917.

FIG. 18C illustrates the cap 908 as having two sections that may be overlapped in varying degrees to allow for width adjustment. This, in turn, provides for an assembled cap that when tightened provides an adjustable width cap for accommodating kayaks of varying thicknesses or depths.

In various exemplary embodiments, a wide range of straps may be used for securing another potion of the kayak, skis, snowboard, etc. to a second or rear-most attachment point, second crossbar or a side rail (in the case where a side rail adapter 200 (FIG. 9) is used). Because the hook, cap, and knob combination clamping devices or clamps disclosed herein tightly secure the sports equipment at a first connection so tightly to the crossbar or side rail (vs. most racks that hold but do not tightly clamp), the second connection provided via a strap may merely function to prevent the skis, etc. from bouncing or moving side to side relative to the rear crossbar connection. But due to the effective clamping provided by embodiments disclosed herein, a stray may not be required or necessarily to securely hold the skis, poles, etc. to the vehicle roof rack.

In alternative embodiments (such as in FIGS. 16A and 16B of Applicant's provisional application 61/398,199 which is incorporated herein by reference), hooks may be attached to the ends of a strap or stretchable strapping material. In such embodiments, one such hook would be secured at each end of the strap, such that they could wrap around the skis, snowboard, etc. The two hooks then would be secured to one-another, where the forces exerted by the stretch strapping would keep it secured and prevent the strap from accidentally detaching. Each hook may be rotated 45° from its triangular base and interlocked together regardless of orientation. The rotated hook is also designed to reduce scratching of any surfaces. FIG. 16A of Applicant's provisional 61/398,199 shows several views of an exemplary hook design. This exemplary embodiment is designed to be used with identical hooks at either end of the strapping and readily interlock regardless of orientation (left or right side). As is shown in this exemplary embodiment, the hooking ends in this embodiment are rotated 45 degrees from the triangular base (where it is attached to the strapping). This rotated hooking end is also designed to reduce scratching of a snowboard surface, for example, when the hooks are secured and resting on the surface of the snowboard. This exemplary apparatus includes a pair of hooks attaching to the opposite ends of a strap are configured to allow it to be used to quickly secure a snowboard, skis, etc. to a crossbar of a vehicle roof rack. The hooks are configured to hook to each other and nest in such a manner so that the hook ends generally do not contact, for example, the snowboard surface and avoid scratching the board surface. The hooks are also configured with a twist to accomplish this feature and to permit nesting when hooked by using two identical parts on the opposite ends of a strap.

Figure 20:
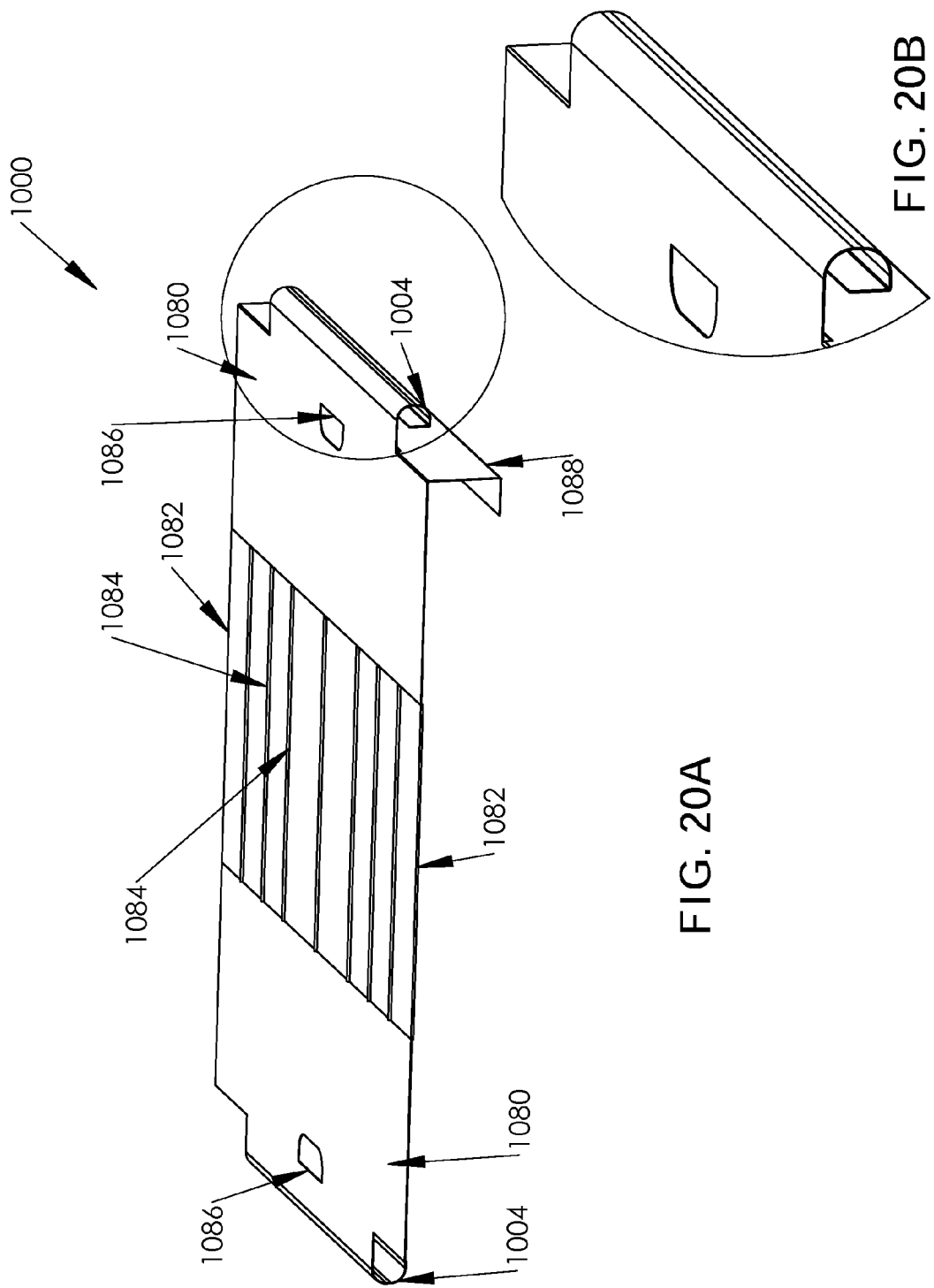

FIGS. 19 and 20 illustrate another exemplary embodiment of a device 1000 embodying one or more aspects of the present disclosure. As shown, the device 1000 is generally configured as a luggage cover that generally includes the hooking and tightening/clamping concepts discussed above. FIG. 19 illustrates the luggage cover or device 1000 installed such that it is holding down luggage or other packages 1016 between a roof rack's primary two or front/back crossbars 1024. The device 1000, once secured, prevents the luggage 1016 from rising, being lifted or shifted by air currents. The device 1000 may include two generally flat sheets or sections 1080, which may be constructed of a variety of rigid, semi-rigid, or even soft canvas-like materials. The sheets or sections 1080 are connected to or include an elongated hook 1004 at each end. The sheets may be made of plastic or molded material such that the sheets integrally include (e.g., via molding, etc.) the hooking sections or members 1004 at the ends of the sheets or sections 1080. The sheets or sections 1080 may be connected by an elastic section or material 1082 which may be tightened or loosed. Alternative embodiments may include other means besides elastic material to provide a retractable, stretchable, and/or releasable portion.

In addition, the sheet sections 1080 are illustrated as being secured by a series of springs 1084. Alternative embodiments may include other means for letting slack out and taking the slack back in besides springs, such as other biasing devices, a spool on which the sheets 1080 may be wound and unwound via rotation of a crank, etc.

The luggage cover device 1000 may be configured such that the assembled device may be hooked over a first crossbar (horizontally) then stretched or extended to hook over a second crossbar at the opposite end of the roof rack. The hooks 1004 may then be tightened further by and would remain secured by the spring or elastic force provided by the springs 1084 or other biasing devices or means of tightening the sections 1080 so that they remained secured. Accordingly, the clamping apparatus in this embodiment 1000 may include a wide variety of means (e.g., springs 1084, etc.) for generating a force that biases the opposing end portions towards each other when the hook members 1004 are hooked over the first and second crossbars 1024, which biasing force inhibits the hook members 1004 from being inadvertently unhooked from the first and second crossbars 1024.

FIG. 20A shows the luggage cover device 1000 and its components with hooks 1004, handle grips 1086, flap 1088 (e.g., for rain, water etc.) and other elements. FIG. 20B is a close up of an exemplary hooking member of the luggage cover device 1000 with one of many types of gates/locking elements for preventing the device from accidentally detaching. In this example, there is a spring loaded or biased gate or edge portion that pops up vertically to help retain the hook portions hooked onto the crossbar. Alternative embodiments may include a locking member that is inserted, folded, or extended through a D-shaped handle opening, that would, while installed/engaged, prevent the J-hook(s) and device from detaching from the crossbar(s) until removed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device suitable for use in securing snowboard to a vehicle roof rack having one or more crossbars, the device comprising:
a frame member including at least two hook components positioned such that the at least two hooks are generally parallel with each other to contain the snowboard between the at least two hooks so to apply an opposing force or at least resistance perpendicular to hook tensioning, the at least two hook components having lower curved portions configured to be hooked under a crossbar of a vehicle roof rack; and
a clamping apparatus including a threaded rod coupled to the frame member having a footpad at one end and a handle at another end, whereby rotation of the threaded rod via the handle moves the threaded rod relative to the frame member thus allowing the footpad to be lowered into contact with the snowboard to thereby create a clamping force between the footpad and the crossbar sufficient for securing the device and snowboard to the crossbar with only the footpad and the crossbars contacting the snowboard.

2. The device of claim 1, further comprising a locking mechanism for restricting rotation of the handle to thereby inhibit inadvertent loosening or removal of the device.

3. The device of claim 1, wherein:
the at least two hook components are spaced apart so as to inhibit side to side movement of the equipment.

4. The device of claim 3, further comprising a strap for securing the snowboard to a second crossbar of the vehicle roof rack.

5. The device of claim 1, wherein the at least two hook components are connected to each other by a center span, and wherein the frame member has a single piece, monolithic construction.

6. The device of claim 1, wherein the frame has a single piece, monolithic construction.

7. The device of claim 1, wherein the device is configured to positively engage and lock the snowboard being installed and carried on a rack without requiring heavy tensioning.

8. The device of claim 1, wherein the device is configured such that a single part can extend around three sides of the snowboard, and is attachable to a rack with a single step and fastener.

9. The device of claim 1, wherein the device is configured such that rotation of the single handle tensions each of the at least two hooks when their lower curved portions are hooked under the crossbar via the lowering of the footpad into contact with the snowboard and a clamping force created thereby between the footpad and the crossbar.

10. A device suitable for use in securing snowboard to a vehicle roof rack having one or more crossbars, the device comprising:
a frame member including at least two hook components positioned such that the at least two hooks are generally parallel with each other to contain the snowboard between the at least two hooks so to apply an opposing force or at least resistance perpendicular to hook tensioning, the at least two hook components having lower curved portions configured to be hooked under a crossbar of a vehicle roof rack;
a clamping apparatus including a threaded rod coupled to the frame member having a footpad at one end and a handle at another end, whereby rotation of the threaded rod via the handle moves the threaded rod relative to the frame member thus allowing the footpad to be lowered into contact with the snowboard to thereby create a clamping force between the footpad and the crossbar sufficient for securing the device and snowboard to the crossbar;
wherein:
the device is configured for securing the snowboard to the crossbar of the vehicle roof rack with only the footpad and the crossbars contacting the snowboard;
the at least two hook components are spaced apart so as to inhibit side to side movement of the snowboard;
the at least two hook components are connected to each other by a center span; and
the frame member has a single piece, monolithic construction.

11. The device of claim 9, wherein the device is configured to positively engage and lock the snowboard being installed and carried on a rack without requiring heavy tensioning.

12. The device of claim 9, wherein the device is capable of engaging and containing a snowboard that does not have holes for hardware to pass through.

13. The device of claim 9, wherein the device is configured such that rotation of the single handle tensions each of the at least two hooks when their lower curved portions are hooked under the crossbar via the lowering of the footpad into contact with the snowboard and a clamping force created thereby between the footpad and the crossbar.

14. A device suitable for use in securing a snowboard to a vehicle roof rack having one or more crossbars, the device comprising:
a frame member including at least two hook components positioned such that the at least two hooks are generally parallel with each other to contain the snowboard between the at least two hooks so to apply an opposing force or at least resistance perpendicular to hook tensioning, the at least two hook components having lower curved portions configured to be hooked under a crossbar of a vehicle roof rack;

a clamping apparatus including a threaded rod coupled to the frame member having a footpad at one end and a handle at another end, whereby rotation of the threaded rod via the handle moves the threaded rod relative to the frame member thus allowing the footpad to be lowered into contact with the snowboard to thereby create a clamping force between the footpad and the crossbar sufficient for securing the device and the snowboard to the crossbar; and wherein:

the device is configured such that rotation of the single handle tensions each of the at least two hooks when their lower curved portions are hooked under the crossbar via the lowering of the footpad into contact with the snowboard and a clamping force created thereby between the footpad and the crossbar;

the device is configured for securing the snowboard to the crossbar of the vehicle roof rack with only the footpad and the crossbars contacting the snowboard;

the at least two hook components are spaced apart so as to inhibit side to side movement of the snowboard;

the at least two hook components are connected to each other by a center span; and the device is configured as a single device capable of engaging and containing the snowboard even though the snowboard does not have holes for hardware to pass through.

* * * * *